United States Patent [19]

Yokomachi et al.

[11] Patent Number: 5,323,279

[45] Date of Patent: Jun. 21, 1994

[54] MAGNETIC TAPE DRIVING APPARATUS WITH CAPSTAN ROTATING AT DIFFERENT SPEEDS

[75] Inventors: Yoshiyuki Yokomachi; Tohru Okuda; Shigeaki Kakiwaki, all of Nara; Akinori Aratani, Higashihiroshima; Masaji Tsuji, Yamatokouriyama, all of Japan

[73] Assignee: Sharp Kabushiki Kaisha, Osaka, Japan

[21] Appl. No.: 588,138

[22] Filed: Sep. 26, 1990

[30] Foreign Application Priority Data

Sep. 28, 1989 [JP] Japan .................. 1-256135
Sep. 28, 1989 [JP] Japan .................. 1-256136

[51] Int. Cl.⁵ ........................... G11B 5/008
[52] U.S. Cl. ................................ 360/26.2
[58] Field of Search ............. 360/95, 71, 96.3, 96.2, 360/74.3, 22, 73.09

[56] References Cited

U.S. PATENT DOCUMENTS

| | | | |
|---|---|---|---|
| 4,067,051 | 1/1978 | Nakamura | 360/95 |
| 4,309,728 | 1/1982 | Takizawa et al. | 360/74.3 |
| 4,390,909 | 6/1983 | Sakamoto | 360/96.2 |
| 4,638,380 | 1/1987 | Wilkinson | 360/22 |
| 5,031,056 | 7/1991 | Okada et al. | 360/74.3 |
| 5,070,422 | 12/1991 | Sasaki et al. | 360/74.3 |

FOREIGN PATENT DOCUMENTS 55-48376 12/1980 Japan .
60-231949 11/1985 Japan .................. 360/74.3

Primary Examiner—A. J. Heinz

[57] ABSTRACT

A magnetic tape driving apparatus includes: a stationary magnetic head capable of recording and reproducing digital signals simultanouesly on multichannel tracks; tape guide members for drawing out a magnetic tape wound on a pair of tape supply/take-up reels contained in a cassette, contacting the magnetic tape with the stationary magnetic head, and guiding running of the magnetic tape; and a constant speed driving mechanism for holding the magnetic tape and making it run at a constant speed by capstans and pinch rollers provided on both of tape feed/take-up sides of the stationary magnetic head. The stationary magnetic head and the tape guide members having level regulators for regulating running positions of upper and lower edges of the magnetic tape, to regulate the level of running of the tape with high precision. The rotating speeds of the capstans on both of the tape feed/take-up sides are regulated, whereby the tension of the tape is maintained at a desired prescribed value, to ensure a stable running of the tape.

19 Claims, 12 Drawing Sheets

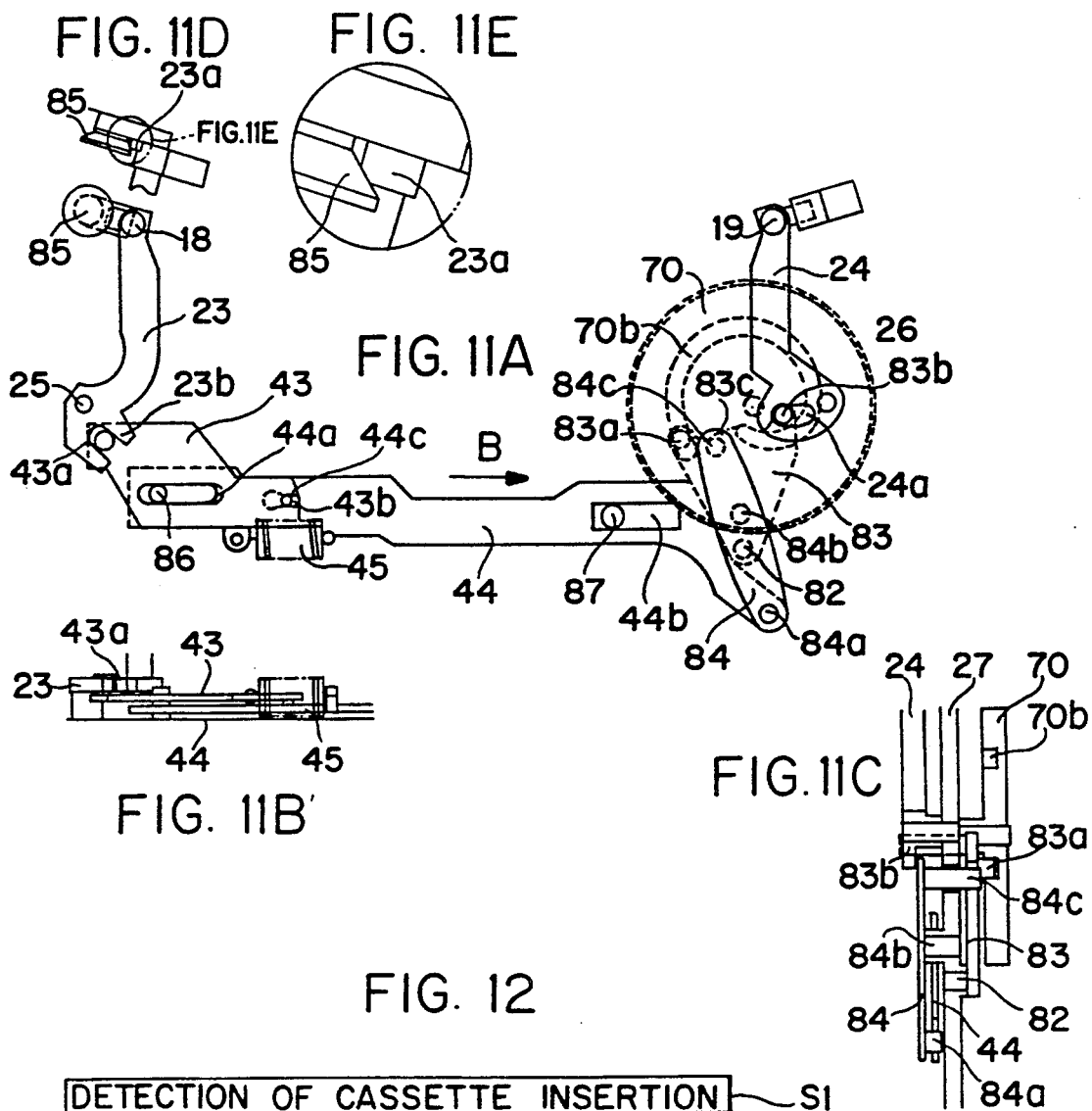
FIG. 11D
FIG. 11E
FIG. 11A
FIG. 11B
FIG. 11C
FIG. 12
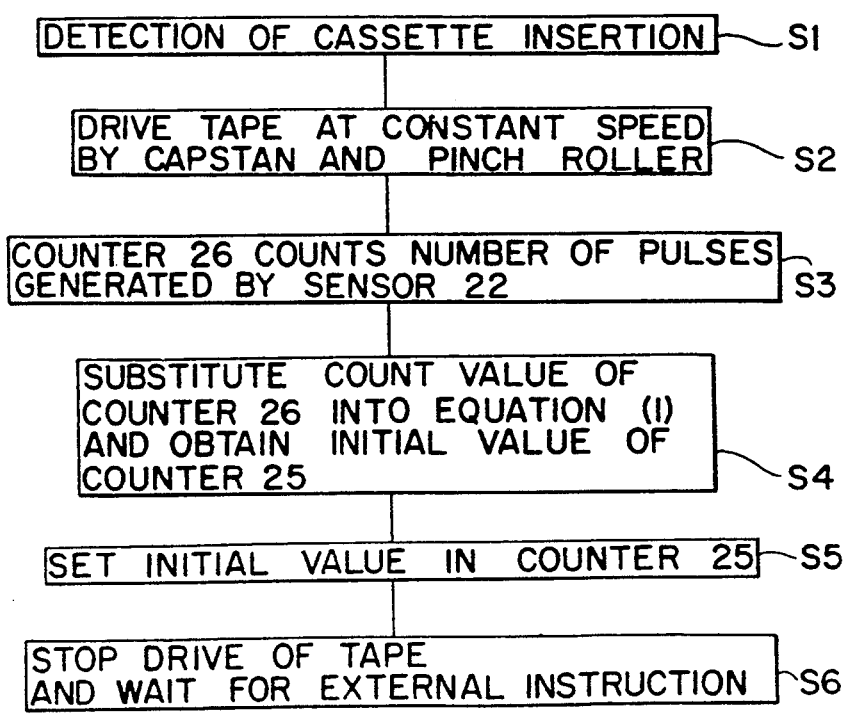

5,323,279

MAGNETIC TAPE DRIVING APPARATUS WITH CAPSTAN ROTATING AT DIFFERENT SPEEDS

BACKGROUND OF THE INVENTION

Field of the Invention

The present invention relates to a magnetic tape driving apparatus for use in a magnetic recording and reproducing apparatus, and particularly to a magnetic tape driving apparatus which records and reproduces multichannel signals by a digital system by storing a pair of supply/take-up reels on which a magnetic tape is wound into a cassette, drawing out the magnetic tape from the cassette and running the magnetic tape in contact with a magnetic head of a stationary type capable of simultanouesly recording or reproducing signals of multiple tracks.

Description of the Background Art

Magnetic tape apparatus which record and reproduce signals of multiple channels on a single tape are called multichannel recorders. Those multichannel recorders include music and recorders for data. Such a multichannel recorder for music is capable of recording a sound signal or reproducing a recorded signal and simultaneously recording the signal on another channel. Such a multichannel recorder is also capable of recording or reproducing music signals of three channels or more separately on a single tape in order to composite recorded signals of two channels or more and to record the composite signal on another channel for editing. Multichannel data recorders record and reproduce coded data signals and can exchange data signals of respective channels and thus they are expected to be widely utilized for computers and the like. Such multichannel recorders have been already developed. For example 16-channel to 64-channel recorders of an analog or digital recording system by an open reel type for business use have been developed. As multichannel recorders using cassettes, apparatus of a 4-channel analog recording system mainly for audio apparatus using compact cassettes are now utilized in homes.

The above-mentioned multichannel recorders for business use are large-sized and expensive and the handling thereof is complicated because of the open reel. The multichannel recorders of the cassette type for home use are small-sized and easy to handle. However, in a multichannel recorder for a conventional compact cassette using a ¼ inch tape, the magnetic head itself moves at the time of recording/reproduction and contacts the magnetic tape running inside the cassette. As a result, vertical shake of the head occurs according to the movement of the head and it is difficult to maintain vertical positioning with high precision. Thus, there are limitations in vertical relative positioning precision of the head with respect to the running of the tape and it is not possible to apply such recorders to a system of recording and reproducing signals on a large number of tracks.

In order to solve such problems of the conventional cassette type, a system in which the head is always fixed to the chassis and the tape is drawn out from the cassette and brought into contact with the head in recording/reproduction has been already developed (for example as disclosed in Japanese Patent Publication No. 55-48376). According to this system, tape drawing members such as a pinch roller and a tape drawing guide are set in a depressed portion of the cassette and the tape drawing members are moved to draw out the tape from the cassette so as to form a prescribed running path and the tape runs at constant speed while it is held by the capstan and the pinch roller. Since the head is fixed in this system, the vertical positioning of the head per se can be maintained with high precision. The level of the magnetic tape is regulated by flange-shaped level regulators formed on the head for regulating upper and lower edges of the tape in contact with the head.

However, by only regulating the level of the magnetic tape in the head, it is not possible to avoid the influence of vertical shake of the magnetic tape before and after running on the head, and relative vertical positioning of the head and the tape cannot be attained with a sufficient precision for a system of multiple tracks such as a system enabling simultaneous recording/reproduction of 44 tracks with a tape of 8 mm in width, for example.

In addition, in the case of a digital multichannel recorder unit, a prescribed pressure enabling contact of the tape with the head and a high stability of tape running speed are required. Consequently, it is necessary to keep the tension of the magnetic tape running near the head constant. In this regard also, sufficient measures for application to digital multichannel recorder units have not been taken in any of the conventional systems using cassettes.

SUMMARY OF THE INVENTION

An object of the present invention is to provide a magnetic tape driving apparatus capable of maintaining a relative vertical positioning of a magnetic tape and a stationary magnetic head with high precision in a digital recording system in which a magnetic tape wound on a pair of supply/take-up reels contained in a cassette is drawn out from the cassette to run in contact with the head, whereby the magnetic tape driving apparatus of the above-mentioned system can be applied to a digital multichannel recorder unit recording and reproducing digital signals of multiple channels simultaneously.

Another object of the present invention is to provide a tape running system of a magnetic tape driving apparatus which can constantly maintain a stable tape tension to obtain a prescribed pressure of contact of a magnetic tape with a stationary magnetic head and a high stability of a tape running speed required in a cassette type magnetic recording and reproducing apparatus applied to a digital multichannel recorder unit.

A magnetic tape driving apparatus according to the present invention includes: a stationary magnetic head capable of recording and reproducing digital signals simultaneously on multichannel tracks; tape guide members for drawing out a tape wound on a pair of supply/take-up reels contained in a cassette, contacting the tape with the stationary magnetic head, and guiding the running of the magnetic tape; and a constant speed driving mechanism having capstans and pinch rollers rotating at a constant speed on the tape feed and take-up sides of the stationary magnetic head. The stationary magnetic head and prescribed members of the tape guide members are provided with level regulators for regulating the running position at upper and lower edges of the magnetic tape.

According to the present invention, a relative positional relation in the vertical direction between the stationary magnetic head and the magnetic tape can be maintained with a very high precision in a recording- /reproducing mode and thus it is possible to apply a cassette system to a digital multichannel recorder unit.

The level regulators of the magnetic tape are preferably arranged to regulate alternately the upper and lower edges of the tape along the tape running direction. This makes it possible to position the upper and lower edges of the magnetic tape smoothly and with high precision.

A magnetic tape driving apparatus according to another aspect of the present invention has the recording-/reproducing mode as described below. A rotation driving source for the tape supply/take-up reels in the constant speed driving mechanism functions to drive the respective capstans so that the rotating speed of the capstan on the tape feed side may be slower than the rotating speed of the capstan on the tape take-up side, while a belt provided in a prescribed positional relation between the rotation driving source and the supply/take-up reels to transmit a rotation driving force has a prescribed elasticity.

Thus, the present invention makes it possible to stably maintain the tape tension in the recording/reproducing mode constantly at a desired prescribed value. Consequently, the contact pressure of the tape with the stationary magnetic head and the tape running speed can be stably maintained so as to be suited for a digital multichannel recorder unit.

The mechanism maintaining stably the tape tension of the magnetic tape in the driving apparatus according to the present invention includes more specifically a tape tension controller. The tape tension controller has a tape tension detector and it regulates the rotating speed of the rotation driving source for the tape supply/take-up reels according to the tension detected by the tape tension detector and performs feedback control to maintain the tape tension at a prescribed value.

More preferably, the tape tension controller controls the tape tension before running of the tape between the capstan and pinch roller on the tape feed side, and the tape tension after running of the tape between the capstan and pinch roller on the tape take-up side so that those tape tensions may have prescribed values. This makes it possible to maintain further stably the tape tension near the magnetic head and the contact pressure of the tape with the head.

The foregoing and other objects, features, aspects and advantages of the present invention will become more apparent from the following detailed description of the present invention when taken in conjunction with the accompanying drawings

BRIEF DESCRIPTION OF THE DRAWINGS

FIG. 11A is a view showing a driving mechanism of a drawing guide in the above-mentioned apparatus; FIG. 11B is a partial view thereof taken from the lower side; FIG. 11C is a right side view of the mechanism of FIG. 11A; FIG. 11D is a partial top view of the mechanism of FIG. 11A; and FIG. 11E is a partial enlarged view thereof.

FIG. 12 is a flow chart of processing from insertion of a cassette to detection of the number of turns of the tape in the magnetic tape driving apparatus of the embodiment of the invention.

DESCRIPTION OF THE PREFERRED EMBODIMENTS

An embodiment of the present invention will be described in the following with reference to the drawings.

A magnetic tape driving apparatus of the embodiment applied to a digital multichannel recorder unit DRU has the following construction.

Figure 1:
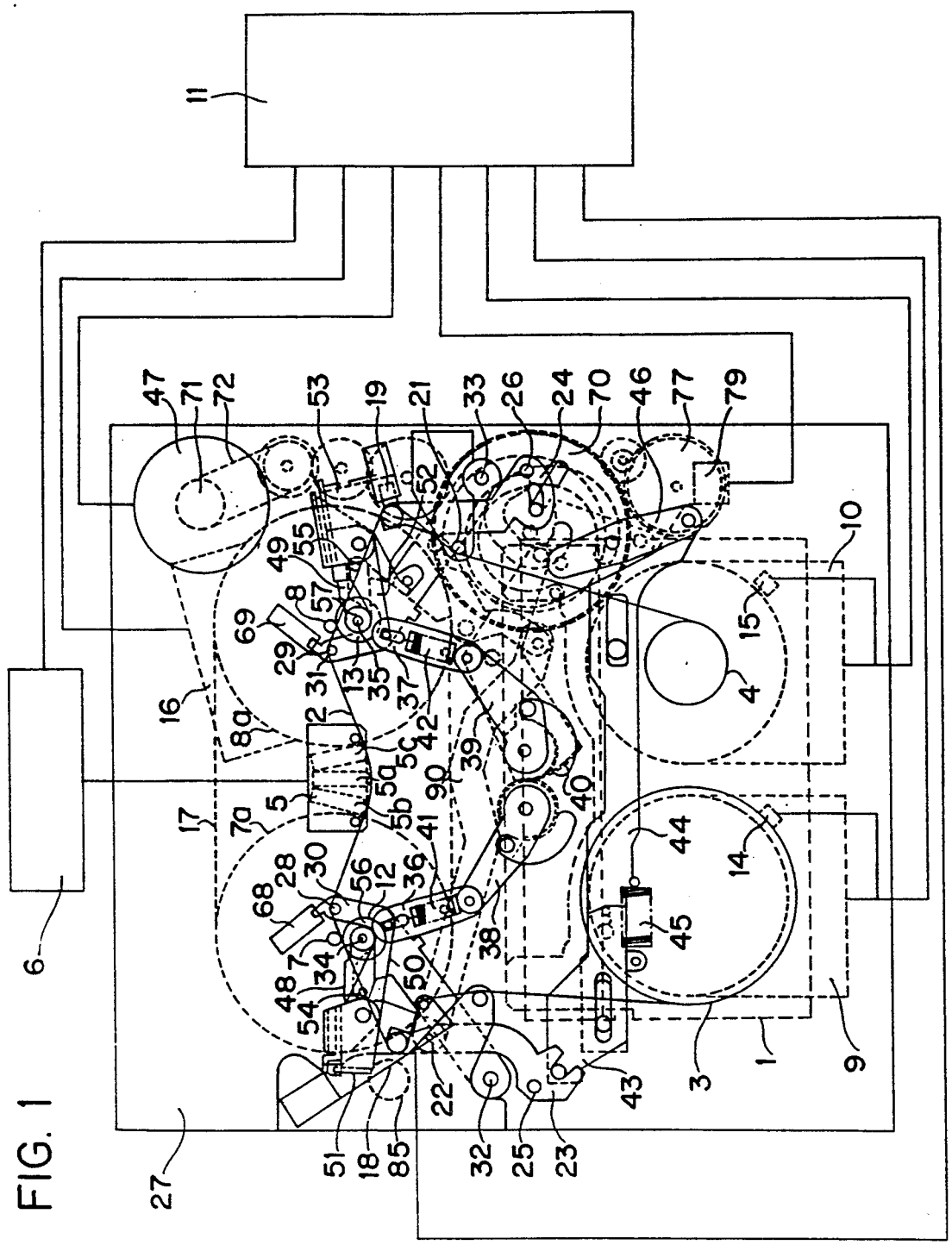
FIG. 1 is a view showing an entire construction of a magnetic tape driving apparatus according to an embodiment of the present invention, which is in a recording/reproducing mode.

Referring to FIG. 1, a head 5 enables recording and reproduction of 44 tracks including auxiliary tracks in a tape 2 of 8 mm in width. The head 5 is a composite head having a head dedicated to recording and two heads dedicated to reproduction. The head 5a dedicated to recording is a magnetic head of an inductance head system and it is provided with inductance head recording elements of 44 tracks formed by semiconductor process technology. Each of the heads 5b and 5c dedicated to reproduction is provided with magnetic resistance elements of 44 tracks formed by semiconductor process technology.

The heads 5b and 5c dedicated to reproduction are located on the tape feed side and the tape take-up side on both sides of the head 5a dedicated to recording. The reproduction head 5b on the feed side reproduces a signal already recorded before the tape 2 runs on the recording head 5a so that the signal is used for editing of a music signal. The reproduction head 5c on the take-up side readily reproduces a signal recorded by the recording head 5a so that the signal is used for simultaneous monitoring. Reproducing operation can be performed by either of the reproduction heads 5b, 5c.

The 44 tracks are used in the following manner. 40 tracks out of the 44 tracks are used for recording and reproduction of a sound signal of data of 8 channels, each of which corresponds to 5 tracks. The remaining four tracks are used for recording and reproduction of auxiliary data. A track out of the four auxiliary tracks is used for recording and reproduction of position information of the tape 2.

A signal processing circuit 6 converts a digitized sound signal externally applied through the unit DRU to a signal to be recorded and records the signal in the tape 2 through the head 5. The signal processing circuit 6 performs processing such as error correction and signal conversion so that a signal already recorded in the tape 2 and reproduced by the head 5 can be supplied externally. In addition, the signal processing circuit 6 generates signals to be recorded or reproduced on the auxiliary tracks.

Switching of recording/reproduction on the 8 channels can be made in an arbitrary manner. Thus, it is possible to perform any of simultaneously recording of all channels, simultaneous reproduction of all channels, and recording of only specified channels out of the eight channels. The switching of recording/reproduction is controlled by a control device 11 applying an instruction signal to the signal processing circuit 6.

Figure 2:
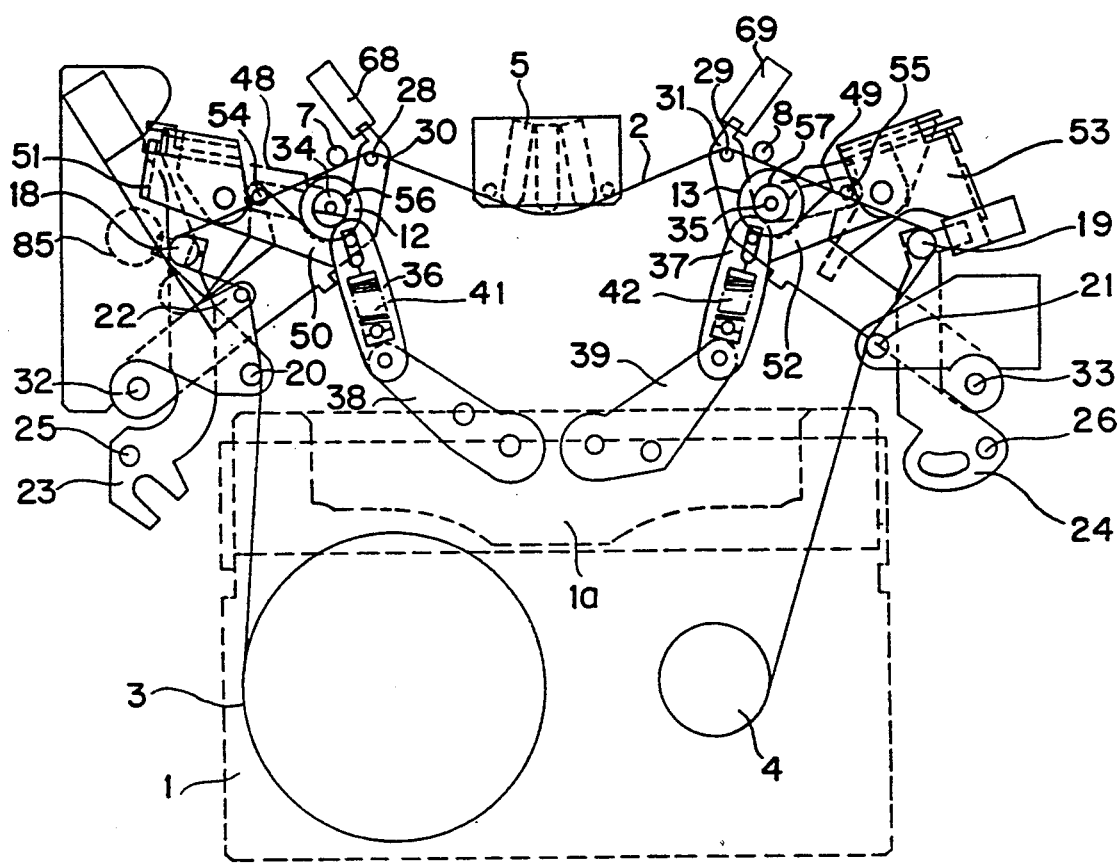
FIG. 2 is a view showing a main part structure of the above-mentioned apparatus in a search/pause mode.
Figure 3:
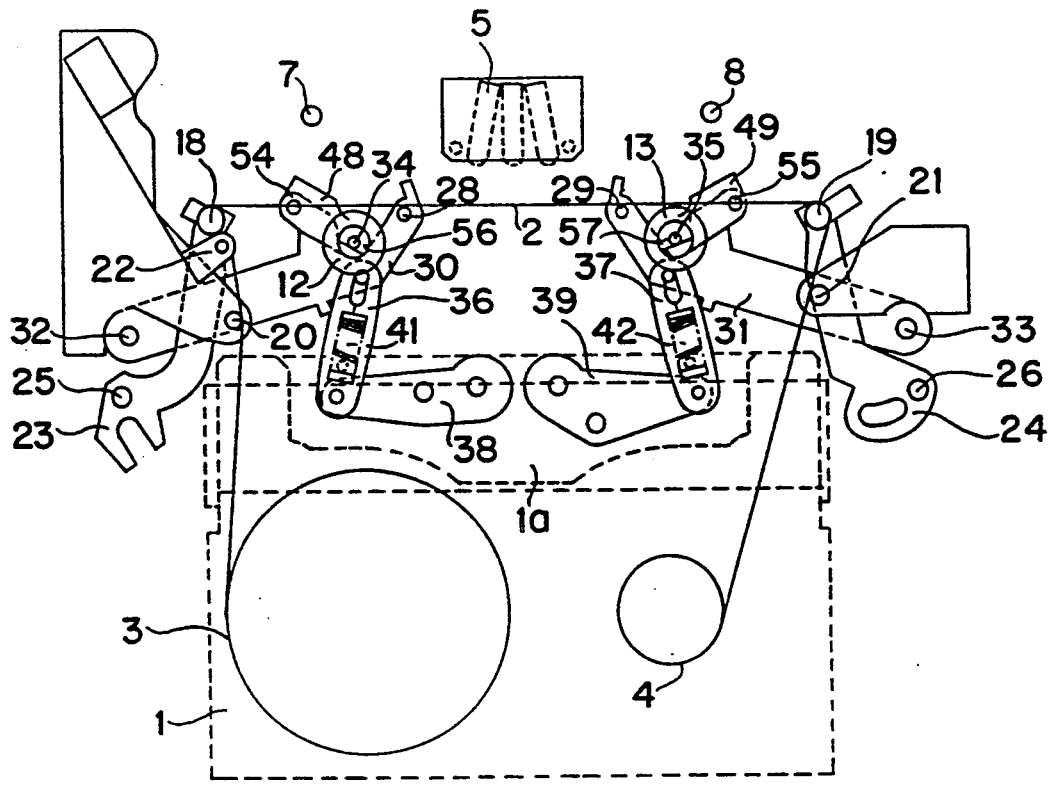
FIG. 3 is a view showing a main part structure of the above-mentioned apparatus in fast forwarding/rewinding/stop modes.
Figure 4:
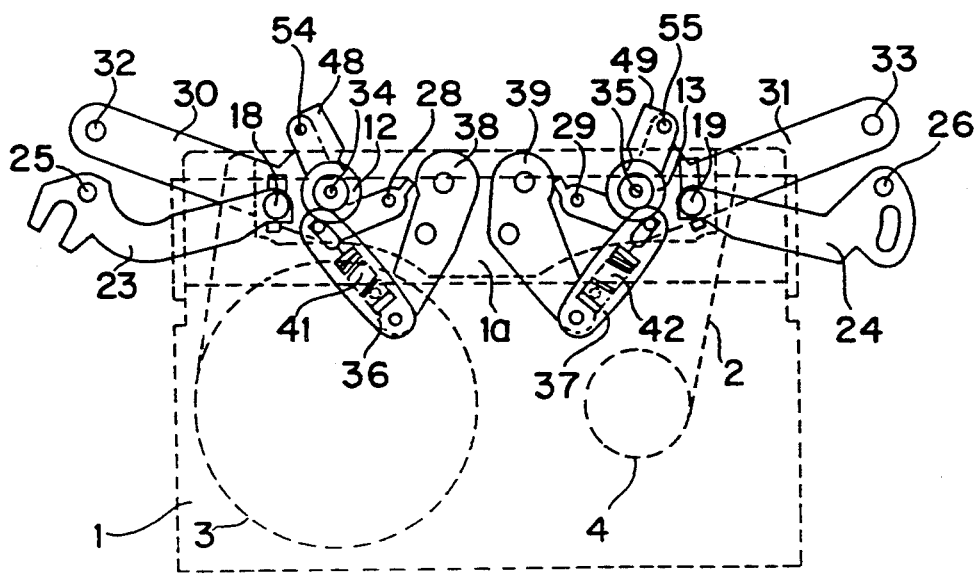
FIG. 4 is a view showing a main part structure of the above-mentioned apparatus in a cassette ejecting mode.

The unit DRU can be set to any of a recording/reproducing mode, a search/pause mode, a fast forwarding-/rewinding mode, a stop mode and a cassette ejecting mode as described below. In the recording/reproducing mode, the head 5 and the tape 2 shown in FIG. 1 are in contact and the tape 2 is pressed by capstans 7, 8 and pinch rollers 12, 13 and driven so that the signal processing circuit 6 can perform recording/reproducing operation arbitrarily on the respective channels of the tape 2. In the search mode, the head 5 and the tape 2 are brought into contact as shown in FIG. 2 and the tape 2 is driven by reel motors 9, 10 without being pressed by the capstans and pinch rollers so that the signal processing circuit 6 reproduces the position information of the tape recorded on the auxiliary track. In the fast forwarding/rewinding mode, the head 5 and the tape 2 are not in contact as shown in FIG. 3 and the tape 2 is driven by the reel motors 9, 10. In the pause mode, the tape 2 is temporarily stopped in the search mode. In the stop mode, the tape 2 is stopped in the fast forwarding-/rewinding mode. In the cassette ejecting mode, the cassette 1 is not set in the unit DRU as shown in FIG. 4. Only in the recording/reproducing mode among those modes, the running direction of the tape 2 is always constant and the tape 2 runs in the direction from the supply reel 3 to the take-up reel 4. The tape 2 can run in the opposite direction in the other modes, i.e., the search mode and the fast forwarding/rewinding mode.

In the recording/reproducing mode shown in FIG. 1, the tape 2 is pressed by the capstans 7, 8 and the pinch rollers 12, 13 and the rotations of the capstans 7, 8 are accurately controlled to be constant, whereby the tape 2 is fed at a constant speed.

In the search mode, the tape 2 is fed by using the reel motors 9, 10 at a constant speed five times faster than that in the recording/reproducing mode without being pressed by the capstans and pinch rollers. By reproduction of the tape position information recorded on the auxiliary track, the tape 2 can be stopped at an arbitrary position or can start to move from an arbitrary position for recording/reproducing. The tape speed is detected and controlled to be constant by rotation sensors 14, 15 in the reel motors 9, 10.

In the fast forwarding/rewinding mode shown in FIG. 3, the tape 2 is fed by the reel motors 9, 10 at a speed faster than that in the search mode while it is not in contact with the head 5. Since the head 5 and the tape 2 are not in contact, the tape running speed is maximum in this state. Although the position information recorded in the tape 2 cannot be read since the head 5 and the tape 2 are not in contact, the numbers of turns of the tape wound on the supply reel 3 and the take-up reel 4 are detected by the rotation sensors 14, 15 of the reel motors 9, 10, respectively. The control device 11 calculates a tape position from the numbers of turns on the supply and take-up reels 3, 4 according to a calculation equation as described below, whereby the tape 2 is stopped, recorded or reproduced at a desired position. The positioning precision at this time is worse than that in the search mode since the position information recorded in the tape 2 is not reproduced, but the tape running speed is faster than that in the search mode and an arbitrary position on the tape can be detected for a shorter period than in the search mode.

In order to stably record or reproduce data on the tape 2 in the recording/reproducing mode shown in FIG. 1, it is necessary to accurately control the running of the tape 2 and to bring the tape 2 into contact with the head 5 under a prescribed pressure. In order to apply a stable tension to the tape 2 enabling contact of the tape 2 with the head 5 under the prescribed pressure, the capstans 7, 8 arranged on both sides of the head 5, as well as the pinch rollers 12, 13 press the tape 2 which is being fed. The two capstans 7 and 8 are driven in different manners. The capstan 8 on the take-up reel 4 is directly driven by a capstan motor 16. The other capstan 7 on the supply reel 3 is driven by the rotation of the capstan 8 transmitted by a belt 17. In this case, pulleys 7a, 8a on which the belt 17 for the two capstans 7, 8 is set have different diameters to enable the number of revolutions of the capstan 7 to be a little smaller than that of the capstan 8 and the belt 17 has a prescribed elasticity, whereby a prescribed tape tension occurs in the tape 2 due to the difference of the numbers of revolutions of the capstans 7, 8 on both sides of the head 5. The tape tension is measured by a tape tension sensor 22 provided in the magnetic head, which detects deflection of a plate spring and converts it to an electric signal. If the tape tension is 100 gr or more, the tape will be excessively stretched or cut, making it difficult for the motors to rotate normally. If it is 40 gr or less, the tape can not contact the head stably. Therefore, the tape tension is preferably in the range of 50 to 70 gr. In this embodiment, the tape tension of 60 gr is applied to the tape.

In order to apply a stable tape tension, the supply and take-up reels 3, 4 are driven directly by the reel motors 9, 10, and the driving force of the reel motors 9, 10 is controlled by the control device 11. The tape tension applied to the tape 2 before it reaches the capstan 7, and the tape tension applied to the tape 2 after it moves from the capstan 8 are controlled electrically by the control device 11 in the below described manner.

The tension of the tape 2 moving onto the capstan 7 on the feed side needs to be more stable compared with the tension of the tape 2 moving out from the capstan 8 on the take-up side. Therefore, in order to set a stable tension accurately independent of the radius of the turns of the tape 2 on the supply reel 3 or external disturbance, the following construction is adopted and the operation is controlled in the following manner. The tape tension sensor 22 for detecting the tension of the tape 2 based on deflection of the plate spring and converting it to an electrical signal is provided between a drawing guide 18 for drawing out the tape 2 from the cassette 1 and guiding the tape 2 along a prescribed path, and a first guide 20 located in the path in a position closest to the cassette 1. In response to an output of the tape tension sensor 22, the driving force of the reel motor 9 driving the supply reel 3 is electrically controlled in a feedback manner by the control device 11 so that the tape tension becomes constant.

The tape tension of the tape 2 moving out from the capstan 8 on the take-up side is controlled to be substantially constant by the below described method. First, the number of turns of the tape 2 on the take-up reel 4 is detected by the rotation sensor 15 attached to the reel motor 10 driving the take-up reel 4, according to the calculation equations as described afterwards. The control device 11 calculates the radius of the tape 2 wound on the reel 4 and changes the driving force of the reel motor 10 according to the radius, so that the tape tension is substantially constant.

The numbers of turns of the tape 2 on the supply and take-up reels 3, 4 are calculated by the following method.

The reel motors 9, 10 contain the rotation sensors 14, 15 which generate n pulses for one turn synchronizing with the revolution of each of the reels. The control device 11 counts those pulses to detect the number of turns of the tape 2 on each of the supply and take-up reels 3, 4. The number of turns of the tape 2 is counted in a manner in which 1 is added to or subtracted from the number of turns depending on the running direction of the tape 2 each time n pulses from the rotation sensors 14, 15 of the reel motors 9, 10, are counted.

The control device 11 does not have information on the number of turns of the tape 2 on each of the supply and take-up reels 3, 4 of the cassette 1 immediately after the cassette 1 has been set in the unit DRU, and the driving force of the reel motor 10 of the take-up reel 4 in the recording/reproducing mode is not controlled according to the radius of turns of the tape 2. Therefore, when the cassette 1 is set in the unit DRU, the control device 11 immediately selects the recording/reproducing mode and feeds the tape 2 at a constant speed by the capstans 7, 8 to the take-up reel 4, on which the tape 2 is wound, whereby the control device 11 detects the number of turns of the tape 2 on each reel. Since the detection of the number of turns is effected in the same manner on each of the supply reel 3 and take-up reel 4, the following description will be made only on the take-up side.

The rotation sensor 14 of the reel motor 10 driving the take-up reel 4 generates the number Pc of pulses per second indicated in the below-indicated equation (1) with the conditions where the tape running speed in the recording/reproducing mode is Tv (mm/s), the number of turns of the tape on the take-up reel 4 is Rc, the thickness of the tape 2 is Tt (mm), the radius of the take-up reel 4 without tape wound thereon is Rs (mm), and the number of pulses generated for one turn by the rotation sensor 15 is n.

$$Pc = n \times Tv / (2\pi \times (Rc \times Tt + Rs)) \tag{1}$$

where $\phi$ is a circle ratio.

If the radius of turns of the tape on the take-up reel 4 is represented as Rx (mm), the equation (1) can be expressed by the following equation (2).

$$Pc = n \times tv / (2\pi \times Rx) \tag{2}$$

In this case, the radius Rx of turns and the number Rc of turns have a relation represented by the equation (3) using the thickness Tt of the tape 2 and the radius Rs of the reel having no tape wound thereon.

$$Rx = Rc \times Tt + Rs \tag{3}$$

Since the tape running speed of the tape 2 in the recording/reproducing mode is accurately controlled by the capstans 7, 8 as described previously, the tape speed Tv is constant. The thickness Tt of the tape 2 is constant from the beginning to the end of the tape and the radius Rs of the reel having no tape wound thereon is specified by the design standard. Consequently, when pulses from the rotation sensor 15 are counted for a prescribed period, the number Rc of turns of the tape 2 on the take-up reel 4 according to the counted number of pulses is obtained by calculation using the equation (1).

The unit DRU counts pulses generated by the rotation sensors 14, 15 while the feed and take-up reels 3, 4 rotate to travel the tape 2 in the recording/reproducing mode, the search mode, and the fast forwarding/rewinding mode, by using, as an initial value, the number Rc of turns of the tape 2 on each reel measured in the recording/reproducing mode immediately after the mounting of the cassette 1. Each time n pulses are counted, the number Rc of turns is incremented or decremented by one dependent on the running direction of the tape 2.

The tension of the tape 2 wound on the take-up reel 4 has a relation represented by the equation (4) with the radius Rx of turns of the tape on the reel, if the tape tension is Tte (g), and the driving force of the reel motor is Mt (gmm).

$$Mt = Tte \times Rx \tag{4}$$

As indicated in the equation (3), the radius Rx of turns of the tape 2 on the take-up reel 4 is obtained by using the number Rc of turns of the tape on the take-up reel 4 and the thickness Tt of the tape 2. Thus, from the relation shown in the equation (4), the driving force Mt of the reel motor 10 of the take-up reel 4 generating a necessary tape tension in the recording/reproducing mode is obtained and the control device 11 controls the reel motor 10 according to the number Rc of turns of the tape 2. The length of the tape wound on each of the supply and take-up reels 3, 4 is represented by the equation (5) using the radius of the turns of the tape wound on each reel. If the length of the tape wound on each reel is represented as Tl (mm), it is expressed by the following equation (5) using the equations (1), (2) and (3).

$$T1 = n \times (Rx \times Rx - Rs \times Rs)/Tt \quad (5)$$

where Rx is the radius of the turns of the tape 2, Rs is the radius of the reel having no tape wound thereon, and Tt is the thickness of the tape 2.

Since the radius Rs of the reel not having any tape wound thereon is a constant value in the equation (5), the length T1 of the tape wound on the reel is obtained if the radius Rx of turns of the tape is obtained. The radius Rx of turns of the tape has a relation with the number Rc of turns of the tape according to the equation (3). Therefore, the control device 11 which has obtained the number Rc of turns of the tape in the recording/reproducing mode after the mounting of the cassette 1 in the unit DRU determines the length of the tape wound on each reel and always determines the position of the tape. Thus, the control device 11 always counts the number Rc of turns of the tape in the recording/reproducing mode, the search mode, and the fast forwarding/rewinding mode, thereby determining the position of the tape. Consequently, an arbitrary position of the tape can be searched for in the fast forwarding-/rewinding mode although the tape 2 is not in contact with the head 5.

Referring to FIG. 1, the guide members drawing out the tape 2 from the cassette 1 ensure the tape path in each mode of the recorder unit DRU are located substantially symmetrically with respect to the head 5. The drawing guide 18 on the feed side and the drawing guide 19 on the take-up side are located symmetrically with respect to the head 5. Those two drawing guides 18, 19 move the tape in the prescribed path in each mode. The drawing guides 18, 19 have their rollers rotating about their respective shafts and when the tape runs, the rollers rotate to apply no load to the running of the tape. The drawing guides 18, 19 are attached to one end of each of drawing guide arms 23, 24 on the feed and take-up sides. The other ends of the drawing guide arms 23, 24 are rotatable around respective drawing guide arm shafts 25, 26 on the feed side and on the take-up side attached to the chassis 27. When the cassette 1 is set in the recorder unit DRU, the drawing guides 18, 19 are inserted into a space called a mouse 1a provided in the cassette 1 as shown in FIG. 4, containing the guide members between the tape 2 and the cassette 1, whereby the drawing guides 18, 19 rotate about the respective guide arm shafts 25, 26 on the feed and take-up sides to draw the tape 2 to the tape path in each mode.

Referring to FIG. 1, a fixed guide 28 on the feed side and a fixed guide 29 on the take-up side are provided between the head 5 and the capstans 7, 8 to ensure the tape running path in the recording/reproducing mode by contacting the tape 2 with the head 5. Those two fixed guides 28, 29 are located at respective ends of the fixed guide arms 30, 31 on the feed side and on the take-up side moving simultanouesly the pinch rollers 12, 13 and they move simultanouesly with those pinch rollers. The fixed guide 28 on the feed side has a guide portion regulating the level, i.e. the upper or lower edges of the running tape.

The two pinch rollers 12, 13 correspond to the capstans 7, 8 on both sides of the head 5. The pinch rollers 12, 13 are provided rotatably around pinch roller shafts 34, 35 provided on the fixed guide arms 30, 31 by means of pinch arms 48, 49 rotating around pinch arm shafts 54, 55. The pinch arms 48, 49 are constantly actuated by a spring (not shown) in a direction of separating the pinch rollers 12, 13 from the capstans 7, 8. The capstans 7, 8 are pressed against the pinch rollers 12, 13 by pinch pressing arms 50, 51, 52, 53 by means of bushes 56, 57 attached to the pinch roller shafts 34, 35, and the pinch arms 48, 49. The force of the above-mentioned spring is set to press the pinch arms 48, 49 in a specified direction and not to apply load to the pressing arms. The pinch arms 48, 49 are located between the capstans 7, 8 and pinch pressing arms 50, 51, 52, 53 when the fixed guide arms 30, 31 are set.

Figure 5A:
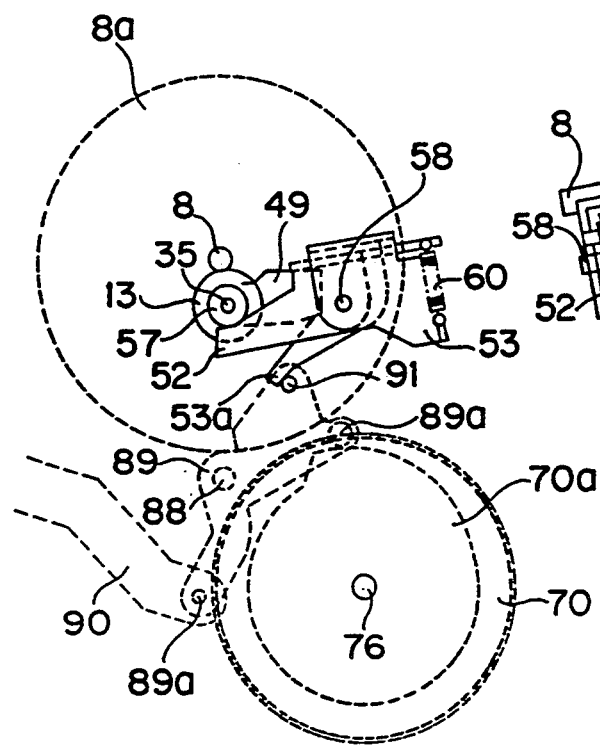
FIG. 5A is a view showing a structure of a pinch pressing mechanism on the tape take-up side of the apparatus.
Figure 5B:
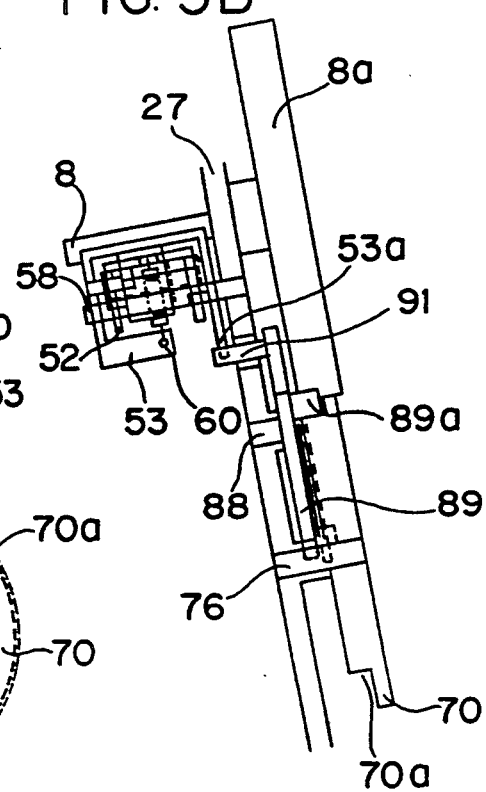
FIG. 5B is a right side view thereof.

As shown in FIGS. 5A and 5B, the two pinch pressing arms 52, 53 on the take-up side are rotatable around the pinch pressing arm shaft 58 on the take-up side. The arm 52 constantly presses an arm projecting portion 53a by means of a spring 60. The spring 60 is provided to cause the two pinch pressing arm shafts 52, 53 to contact each other by the spring force. The pinch pressing arm 53 moves toward the capstan 8 by the force of the spring 60 and moves oppositely by movement of the pinch pressing arm 52 by means of the arm projecting portion 53a. An end 53b of the pinch pressing arm 53 is pressed by a pin 91 through the chassis 27 from the rear side thereof. The pinch pressing arms 52, 53 on the take-up side are constantly actuated toward the pin 91 by a spring (not shown).

The pinch roller 13 is pressed against the capstan 8 by driving the arm 53 by means of the above-mentioned pin 91, and moving the pinch pressing arm 52 toward the capstan 8. Even after the arm 52 stops moving by the contact of the pinch roller 13 with the capstan 8, when the arm 53 is driven by the pin 93, a difference of moving amounts of the arms 52 and 53 causes a spring force of the spring 60, thereby pressing the pinch roller 13 against the capstan 8.

Figure 6B:
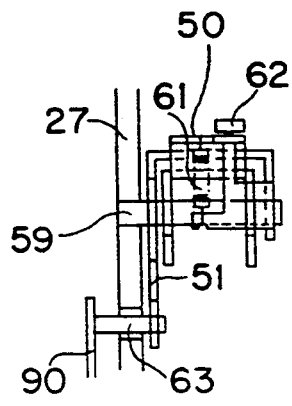
FIG. 6B is a left side view thereof.
Figure 6A:
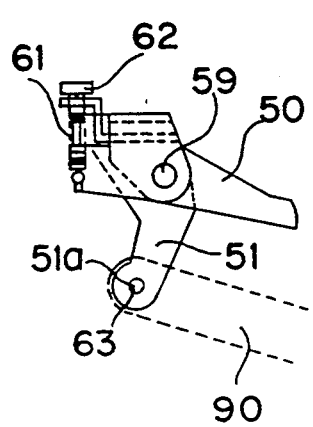
FIG. 6A is a view showing a structure of a pinch pressing lever on the tape feed side.

Similarly, the pinch pressing arms 50, 51 on the feed side press the pinch roller 12 against the capstan 7. The two pinch pressing arms 50, 51 on the feed side shown in FIGS. 6A and 6B are rotatable around the pinch pressing arm shaft 59. The two arms 50, 51 move together by means of a spring 61 constantly actuating the arm 51 against a screw 62 attached to the arm 50. The spring is disposed to contact the two arms 50, 51 by its traction force. The pinch pressing arm 51 moves together with the pinch pressing arm 50 toward the capstan 7 by means of the spring force of the spring 61 and moves together with the arm 50 oppositely by means of the screw 62. A pin 63 moving the pinch pressing arm 51 is inserted in a hole 51a at one end of the pinch pressing arm 51. The pin 63 penetrates the chassis 27 and projects from the rear side and is inserted in the hole 51a.

The pinch roller 12 is pressed against the capstan 7 by driving the arm 51 by means of the above-mentioned pin 63 and moving the pinch pressing arm 50 toward the capstan 7. Even after the arm 50 stops moving by the contact of the pinch roller 12 with the capstan 7, the arm 51 is driven by the pin 63 and a difference of the moving amounts of the arms 50, 51 causes a spring force of the spring 61, which serves as a pinch pressing force to press the pinch roller 12 against the capstan 7. The screw 62 is provided to change the timing of pressing of the pinch roller 12 by the pinch pressing arm 50 dependent on the feed side or the take-up side by changing the angle formed between the arms 50 and 51.

The ends of the fixed guide arms 30, 31 not having the pinch rollers 12, 13 and fixed guides 28, 29 are rotatable around the fixed guide arm shafts 32, 33 attached to the chassis 27. The pinch rollers 12, 13 and the fixed guides 28, 29 are inserted into the mouse 1a when the cassette 1 is set in the recorder unit DRU, in the same manner as in the above-mentioned drawing guides 18, 19 as shown in FIG. 4, and he pinch rollers 12, 13 rotate around the fixed guide arm shafts 32, 33 to form the tape running path in each mode.

Figure 7A:
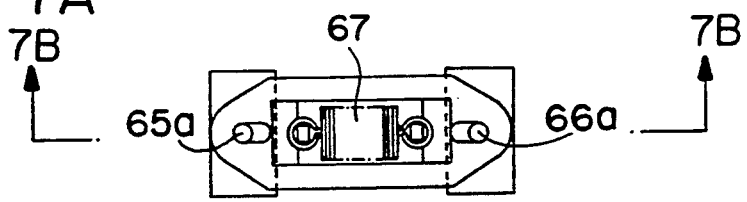
FIG. 7A is a view showing a structure of a spring link.
Figure 7B:
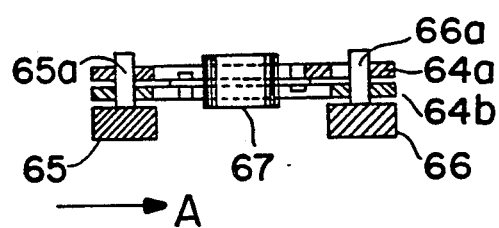
FIG. 7B is a cross sectional view thereof taken along A/A.

The fixed guide arms 30, 31 are driven by transmitting the rotating movement of the spring link arms 38, 39 through the spring links 36, 37. Spring link arm shafts 38a, 39a are attached to the spring link arms 38, 39 on the respective sides not having the spring links 36, 37. Those spring link arm shafts 38a, 39a are inserted in an opening in the chassis 27 and receive driving force from a guide moving mechanism on the rear side of the chassis 27. Each of the spring links 36, 37 has a structure as shown in FIGS. 7A and 7B including a member 65 on the driving side and another member 66 on the driven side coupled through a spring link 64. When the member 65 is to be moved in one direction, the member 66 is moved through the spring force of the spring 67 and when the member 65 is to be moved oppositely, the member 66 is moved without the spring force of the spring 67. The two members 64a, 64b of the spring link 6 have circular and elongate holes at their end portions alternately as shown in FIGS. 7A and 7B. The circular holes of those two members 64a, 64b enable those members to rotate around respective pins 64a, 66a for attaching the spring link 64 to the member 65 on the driving side and the member 66 on the driven side. The elongate holes enable the spring link members 64a, 64b to smoothly move straight perpendicularly to the pins 65a, 66a. The circular and elongate holes of the two members 64a, 64b on each side overlap with respect to one pin. A spring 67 is provided to have a spring force enabling the pins to be constantly pressed against one end of each of the elongate holes of the spring link members 64a, 64b. When the member 65 on the driving side moves in the direction of A, the pin 65a moves in the direction separating from the end of the elongate hole against which the pin 65a is pressed, causing the member 66 on the drive side to move in the direction of A by the spring force of the spring 67. Conversely, the member 65 moves by pressing constantly the pin 65a against the end of the elongate hole and thus the member 66 on the driven side moves without the spring force of the spring 67.

The fixed guide arms 30, 31 are moved by the spring link 36, 37 by the action of spring force when the pinch rollers 12, 13 approach the capstans 7, 8 with the spring link arms 38, 39 being on the driving side. The guide arms 30, 31 are in the same positions in the recording-/reproducing mode and in the search mode. In order to improve the positioning precisions of the fixed guides 28, 28 in the recording/reproducing mode and the search mode, the guide arms 30, 31 have tapered top ends, and position blocks 68, 69 where the tapered ends are fitted are provided in the chassis 27. Thus, the guide arms 30, 31 are pressed against the positioning blocks 68, 69 by the spring force of the spring links 36, 37.

Figure 8:
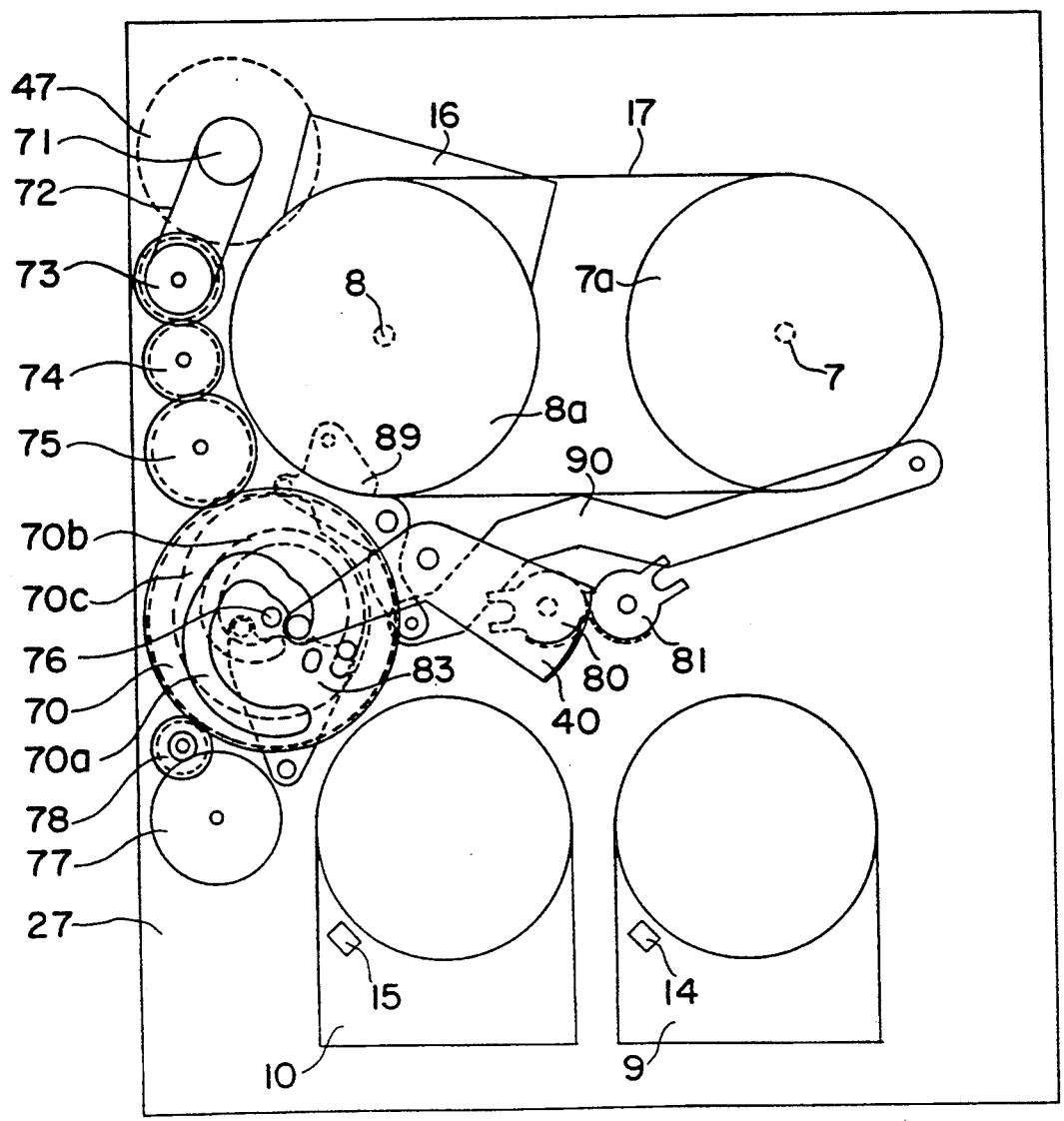
FIG. 8 is a bottom view of the entire structure of the magnetic tape driving apparatus of the embodiment shown in FIG. 1.

As shown in FIG. 8, the pinch rollers, and guide members such as the fixing guides and the drawing guides are driven by a tape loading motor 47 on the upper surface of the chassis 27 rotating through a cam 70 provided on the rear surface of the chassis 27.

The tape loading motor 47 as the driving source for the guides is fixed to the chassis 27 in a manner projecting from the rear surface of the chassis 27 at right angles thereto. A small gear 71 driving a geared belt 72 is fixed to the rotating shaft of the motor 47 projecting from the rear surface of the chassis 27 and the small gear 71 rotates together with the shaft of the motor 47. The geared belt 72 is attached to a first gear 73 of a gear train driving the cam 70 and transmits the rotation of the motor 47. The gear train for speed reduction includes two gears 74, 75 other than the gear 73 and the gear train transmits the rotation of the motor 47 to the cam 70 rotating around a cam shaft 76 attached to the rear surface of the chassis 27.

As shown in FIGS. 5A and 5B, the cam 70 has the shape of a relatively thick disk and its outer circumferential portion is divided into two portions, i.e., an outer cam 70a nearer to the chassis 27 and gear teeth 70d distant from the chassis 27. The outer cam 70a serves to drive the above-mentioned pinch pressing arms 50 to 53 and the gear teeth 70d transmits the rotation of the gear 75.

A groove cam 70b for driving the drawing guides 18, 19 is provided on the upper surface of the cam 70, and a groove cam 70c for driving the guide arms 30, 31 is provided on the lower surface of the cam 70. Each of the groove cams 70b, 70c has a pin smoothly moving in the groove and the respective guides are driven by those pins. A pin 98a is actuated by a spring (not shown) on a sidewall of the outer cam 70a driving the pinch pressing arms 50 to 53. The groove cams 70b, 70c formed on the upper and lower surfaces of the cam 70 include a spiral portion to change the distance from the shaft 76 to the corresponding groove and a circular arc portion to keep the distance constant when the cam 70 rotates with respect to the shaft 76. The pin in each groove in the upper and lower surfaces is attached to an end of the arm rotating around the shaft. When the cam 70 rotates, the arm "rotates in the portion for changing the distance between the groove and the shaft, and the arm" stops temporarily in the circular arc portion for keeping the distance constant. The outer cam 70a also has a portion for changing the distance from the shaft "to the sidewall of the cam" by the rotation of the cam 76 and a circular arc portion for keeping the distance constant, as in the above-mentioned groove cams 70b, 70c, and an arm 89 having a pin 89a operates in the same manner as in the arm of the groove cam. The cam grooves, the sidewall of the outer cam and the circular arc portions keeping the prescribed distances constant define the positions of the guides in the respective modes of the recorder unit DRU and the rotation of the tape loading motor 47 is stopped in those positions.

The fixed guides 28, 29 and the drawing guides 18, 19 are in the same positions in the search mode and the recording/reproducing mode of the unit DRU and they are in other positions in the cassette ejecting mode and the first forwarding/rewinding mode of the unit DRU. The pinch pressing arms 50 to 53 are in the same positions in the cassette ejecting mode the fast forwarding-/rewinding mode and the search mode of the unit DRU and they are in other positions for pressing the pinch rollers 12, 13 in the recording/reproducing mode of the unit DRU. Thus, the groove cam 70b for driving the fixed guide arms 30, 31 and the drawing guides 18, 19 has three circular arc portions corresponding to the ejecting mode, the fast forwarding/rewinding mode, and the search/recording/reproducing mode. The side surface of the outer cam 70a for driving the pinch pressing arms 50 to 53 has two circular arc portions corresponding to the recording/reproducing mode and the other modes. Thus, the cam 70 stops at four positions corresponding to the respective modes of the unit DRU.

Figure 9:
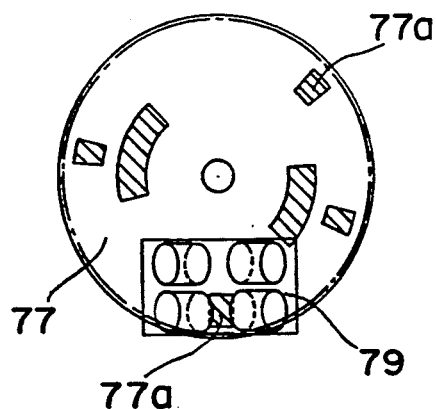
FIG. 9 is a view showing a magnetic tape position detecting mechanism in the above-mentioned apparatus.

The position where the control device 11 stops the cam 70 is detected in the following manner. A sensor gear 77 which rotates by about 360° according to the rotation of the cam 70 transmits the rotation of the cam 70 through a gear 78. This sensor gear 77 detects a rotated position by utilizing reflection of light. The detection is performed as shown in FIG. 9. Referring to FIG. 9, a reflection type sensor 79 capable of detecting reflection of light is provided in proximity to the surface of the sensor gear 77, and a detection portion 77a having a reflectance of light different from that of the other surface is provided in a position for detection on the surface of the sensor gear 77. When the sensor gear 77 rotates and the detection portion 77a passes under the reflection type sensor 79, the reflection type sensor 79 provides a signal to the control device 11. The detection portion 77a of the sensor gear 77 detected by the reflection type sensor 79 indicates a circular arc portion of the cam 70, that is, any of the respective modes of the unit DRU. Such detection portions 77a are provided at four positions corresponding to the respective modes of the unit DRU. In order to change the modes of the unit DRU and to move the guides, the control device 11 rotates the tape loading motor 47 and detects the positions of the moved guides in response to the signals from the sensor gear 77 and the reflection type sensor 79, so as to stop the tape loading motor 47.

Figure 10B:
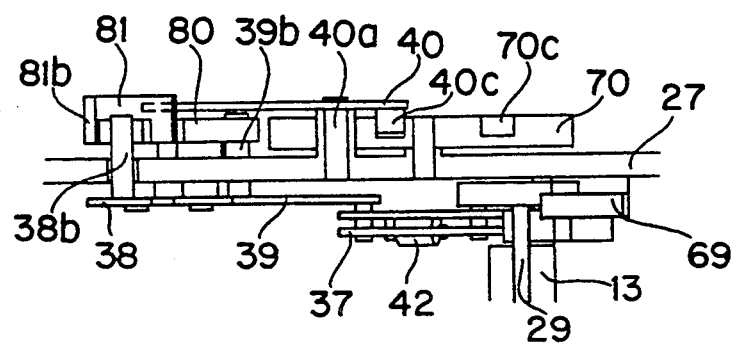
FIG. 10B is a sectional view thereof taken along the line crossing the main rotating shafts.
Figure 10A:
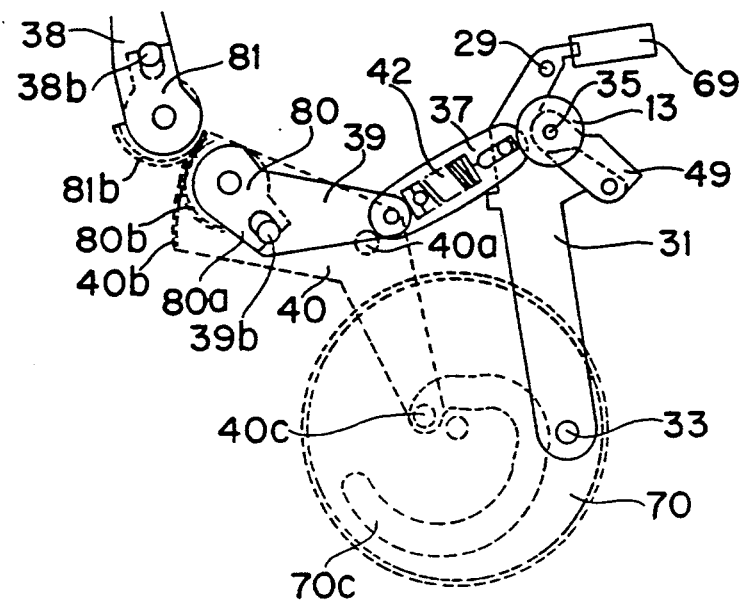
FIG. 10A is a view showing a driving mechanism of fixed guide arms in the above-mentioned apparatus.

The fixed guide arms 30, 31 on the feed side and the take-up side are driven by rotation of the spring link arms 38, 39 coupled through the spring links 36, 37. Since the operation on the feed side and the operation on the take-up side are the same, the operation on the take-up side will be described with reference to FIGS. 10A and 10B. The spring link arm 38 rotates around the spring link arm shaft 39a inserted in the hole in the chassis 27. The pin 39b attached to the spring link arm 38 and penetrating to the rear surface of the chassis 27 is driven from the rear surface of chassis 27, whereby the spring link arm 38 rotates. The spring link arm shaft 39b penetrates the rear surface of the chassis 27 as mentioned above and a small gear 80 rotates around this shaft 39a. An U-shaped arm 80a moving the above-mentioned pin 39b inserted therein is provided in the small gear 80. A small gear 81 rotates around the shaft 38a of the spring link arm 38 on the feed side. Teeth 80b, 81b are formed on the outer circumferences of the small gears 80, 81 to communicate driving force between the small gears 80, 81 and to synchronize the rotations. Thus, the small gears 80, 81 rotate always in synchronization to drive the spring link arms 38, 39. The small gears 80, 81 are driven by rotating a fan-shaped gear 40 by means of the cam groove 70c and the pin 40c. The fan-shaped gear 40 has teeth 40b always engaging with the small gear 81 at one end and a pin 40c at the other end entering the cam groove 70c for driving the fixed guide arms in the cam 70.

The fan-shaped gear 40 rotates clockwise and counterclockwise around a fan-shaped gear shaft 40a provided in the center position of the teeth 40b always engaging with the small gear 81. The teeth 40b are formed in a circular arc portion within the range of engagement with the small gear 81. The pin 40c in the cam groove 70c of the cam 70 rotates the fan-shaped gear 40 around the shaft 40a according to change in the distance between the shaft and the cam groove caused by the rotation of the cam 70. The rotation of the gear 40 rotates the small gear 81 engaging with the teeth 40b at one end, and transmits the rotation to the small gear 80 engaging with the small gear 81. The rotation of the small gear 80 rotates the spring link arms 38, 39 and it further drives the fixed guide arms 30, 31 on the feed and take-up sides through the spring links 36, 37.

The drawing guide arms 23, 24 of the feed and take-up sides are driven in different manners.

The positioning accuracy of the drawing guide 19 on the take-up side is less severe than that on the feed side. Therefore, the drawing guide arm on the take-up side is not positioned by a positioning block as is different from the above-mentioned fixed guide arms 30, 31 and it is positioned by the above-mentioned cam 70.

As shown in FIGS. 11A to 11C, the drawing guide arm 24 on the take-up side rotates around the drawing guide arm shaft 26 attached to the chassis 27 to load the tape. The arm 24 is driven by an arm 83 for driving the drawing guide arm, rotating around a shaft 82 on the rear surface of the chassis 27. The arm 83 has the shape of a fan using the shaft 82 as the center and a pin 83a is attached to one end of the arm 83. The pin 83a enters the drawing guide arm driving cam groove 70b of the cam 70 and moves smoothly. The movement of the pin 83a according to the rotation of the cam 70 enables the arm 83 to rotate clockwise and counterclockwise around the shaft 82. A pin 83b driving the drawing guide arm 19 on the take-up side is attached to the side of the am 83 opposite to the side of the cam 70. This pin 83b penetrates the hole in the chassis 27 and projects from the upper surface of the chassis 27. The pin 83b enters a hole 24a as a part of a circular arc portion of the drawing guide arm 19 and moves the drawing guide arm 19. The arm 83 has a hole 83c for transmitting driving force to levers 43, 44, 84 driving the drawing guide arm 23 on the feed side. In order to accurately define the tape path for the above-mentioned tension sensor 22, the top end portion 23a of the drawing guide arm 23 has a tapered form, which is pressed on the positioning block 85 fixed to the chassis 27 by spring force, whereby the drawing guide 18 on the feed side can be accurately positioned.

As shown in FIGS. 11A to 11C, the drawing guide arm 23 on the feed side rotates around the drawing guide arm shaft 25 attached to the chassis 27. The drawing guide arm 23 has an U-shaped groove 23b where a pin 43a is inserted and moved smoothly. Thus, the movement of the pin 43a drives the drawing guide arm 23. The pin 43a is attached to the lever 43 for driving the drawing guide arm on the feed side, which moves straight along the guides 86, 87 fixed to the chassis 27. The levers 43, 44 are driven by spring force to move in the direction of loading the drawing guide arm 23 in the same manner as in the spring links 36, 37 driving the fixed guide arms 30, 31, and the levers 43, 44 are driven without spring force to move in the opposite direction.

The lever 44 includes a long plate extending horizontally having elongate holes 44a, 44b to move straight along the guides 86, 87 fixed to the chassis 27. An end of the lever 44 on the take-up side has a hole where a pin 84a attached to a lever 84 is inserted. The lever 43 is placed on the lever 44 on the feed side. An end of the lever 43 has a pin 43a for driving the drawing guide arm 23. A pin 43b sliding in an elongate hole 44c is provided on the surface of the lever 43 in contact with the lever 44 to enable straight movement of the lever 43 on the lever 44. The lever 43 has an elongate hole 43c sliding along the guide 86 fixed to the chassis 27, and the elongate holes 43c and 44a are located in an overlapping manner.

Thus, the lever 43 moves straight with respect to either the chassis 27 or the lever 44. A spring 45 is provided between the levers 43 and 44. The spring 45 has spring force enabling constant contact of the pin 43b with a wall when the lever 44 moves in the direction of unloading the drawing guide arm 28. This spring force is a force pressing the drawing guide arm 23 against the positioning block 85 and it is generated by a difference of moving amounts of the levers 43, 44 in the loading direction (the B direction in FIG. 11A).

The lever 44 for driving the drawing guide arm is driven by the above-mentioned cam 70. The groove cam 70b of the cam 70 drives the drawing guides on the feed side and on the take-up side simultaneously.

The rotating directions of the drawing guide arms 23, 24 on the feed side and on the take-up side are opposite in the cases of loading and unloading the tape. Thus, the movement of the arm 83 is transmitted to the lever 44 by an inversion lever 84 inverting the moving direction of the arm 83. A pin 84c entering a hole 83c in the arm 83 is provided at one end of the inversion lever 84 and a pin 84a for driving the lever 44 around a rotating shaft 84b attached to the chassis 27 is provided at the other and thereof. The pinch pressing arms 50 to 53 are driven by the outer cam 70a of the above-mentioned cam 70.

Referring to FIGS. 5A and 5B, a pin 89a contacting the outer cam portion 70a of the above-mentioned cam 70 is attached to one end of a lever 89 for driving the pinch pressing arms, rotating around a shaft 88 attached to the chassis 27. The lever 89 rotates according to the rotation of the cam 70. The rotation of the lever 89 is transmitted to the pinch pressing arm 53 on the take-up side by means of the above-mentioned pin 91 attached to the lever 89, penetrating the hole in the chassis 27.

Referring to FIGS. 5A, 5B, 6A and 6B, the pinch pressing arms 50, 51 on the feed side are driven by the lever 90 connecting the arm 51 and the lever 89, by means of the pinch 89a attached to the lever 89. The above-mentioned pinch 63 driving the pinch pressing arm 51 on the feed side is attached to the top end of the lever 90. This pinch 63 transmits the movement of the lever 89 to the pinch pressing arm 51 through the lever 90, whereby the arm 51 is driven.

CASSETTE EJECTING MODE

The operation of the unit DRU starts when the cassette 1 is loaded by a cassette loader (not shown) and is set in a prescribed position. This is shown in step S1 in the flow chart of FIG. 12. Before the cassette 1 is loaded and set in the prescribed position, the unit DRU is in the cassette ejecting mode shown in FIG. 4 where the pinch rollers 12, 13 as well as the fixed guides 28, 29 and the drawing guides 18, 19 are stopped in positions ready to be inserted into the mouse 1a of the cassette 1 when the cassette 1 is loaded.

TAPE POSITION DETECTING MODE

When the control device 11 detects the setting of the cassette 1 in the prescribed position by means of a cassette detection switch (not shown), it proceeds to step S2 in FIG. 12 to start rotation of the tape loading motor 47 so that the tape 2 is in the recording/reproducing mode. After that, the control device 11 detects positions of the guides in the tape running path in the recording/reproducing mode by means of the sensor gear 77 and the reflection type sensor 79, and then stops the tape loading motor 47. In the recording/reproducing mode, steps S2, S3, and S5 are successively executed. Thus, the tape 2 runs for a prescribed period as mentioned previously and the number Rc of turns of the tape 2 on each of the reels 3 and 4 is calculated. At the same time, the position information of the tape 2 recorded on the auxiliary track is supplied to the control device 11 by using the signal processing circuit 6.

After that, the unit DRU is in the pause mode where it waits for a signal eternally applied to the control device 11.

PAUSE MODE

In the pause mode, the unit DRU waits for the external signal instructing subsequent operation. As shown in FIG. 2, in the pause mode, the tape 2 is not pressed by the capstans and the pinch arms.

RECORDING/REPRODUCING MODE

When the external signal is applied in the pause mode to instruct recording/reproduction, the control device 11 rotates the loading motor 47 and presses the pinch rollers 12, 13 against the capstans 7, 8 to move the tape 2. When the pinch rollers 12, 13 start pressing the tape 2, regulation is made by the screw 62 to enable the pinch roller 13 to attain the capstan 8 a little earlier than the pinch roller 12, so that the tape 2 can be rapidly in a stable running state.

When an external signal instructing stop is applied in this state, the unit DRU proceeds to the stop mode.

STOP MODE

Switching to the stop mode occurs when the control device 11 rotates the loading motor 47 until the sensor gear 77 and the reflection type sensor 79 detect the positions of the guides moved to the tape running path separated from the head 5 as shown in FIG. 4. In the stop mode, the unit DRU waits for an external signal instructing subsequent operation as in the pause mode.

FAST FORWARDING/REWINDING MODE

When an external signal instructing fast forwarding is applied, the control device 11 sets the unit DRU to the fast forwarding/rewinding mode shown in FIG. 3, in which the tape 2 runs by the reel motors 9, 10 in the direction of winding the tape 2 on the reel 4. Switching from this mode to other mode occurs when another external signal is applied, or when the end of the tape 2 is detected by a sensor (not shown) detecting the end of the tape, or when an arbitrary position of the tape designated externally is detected by determining the tape position by using the rotation sensor 15 of the reel motor 10.

In the rewinding mode, a sensor (not shown) for detecting the beginning of the tape is used in place of the above-mentioned sensor for detecting the end of the tape. Switching from the rewinding mode to other mode occurs in the same manner as in the fast forwarding mode.

SEARCH MODE

In the search mode, operation is performed in response to an external signal, or detection of the end or the beginning of the tape by the above-mentioned sensors, detection of a tape position by the rotation sensor of the reel motor, or the tape position information recorded in the auxiliary track by the signal processing circuit 6. In the recording/reproducing mode, operation is performed in response to an external signal, or detection of the end or beginning of the tape by the sensors, and detection of rotation of the reels is not effected. In the search mode, the number of turns of the tape is constantly counted in response to the output of the reel rotation sensor and the voltage applied to the reel motor is changed according to the number of turns of the tape. In consequence, the rotating force of the reel is changed and search is made from the beginning to the end of the tape 2 at a constant tape speed about five times faster than that in the recording/reproducing mode.

All of the operations of the unit DRU stop when an external signal instructs ejecting operation to eject the cassette 1 outside the unit DRU by means of the cassette loader (in step S6 in FIG. 12).

Figure 13:
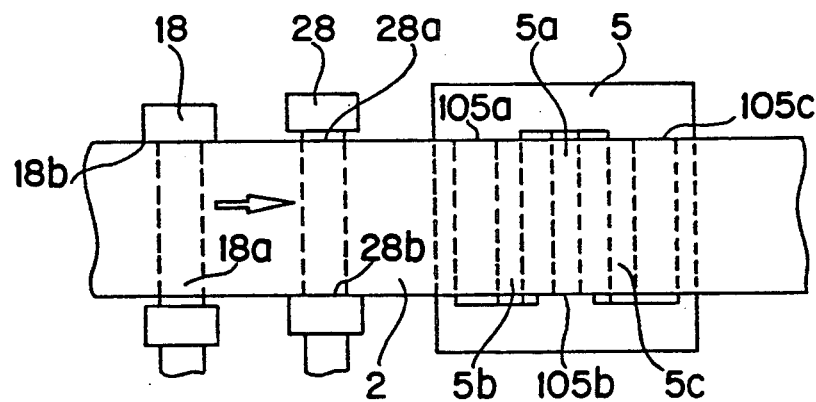
FIG. 13 is an enlarged view of the magnetic head for explaining the level regulating means of the magnetic tape in the embodiment.

Next, referring to FIGS. 13, 14A and 14B, description will be made of the tape running level regulating means of the above-described embodiment, which is an element enabling the cassette system using the stationary magnetic head to be applied to the unit DRU. Referring to FIG. 13, the tape 2 contacts the outer circumference of the roller 18a of the drawing guide 18, the outer circumference of the roller 28a of the fixed guide 28, and the head 5 in this order. First, the drawing guide 18 regulates the position of the tape 2 from the upper side of the tape 2 when the lower end surface 18b of an upper flange of the drawing guide 18 contacts the upper edge of the tape 2. The fixed guide 28 regulates the position of the tape 2 from the lower side thereof when the upper surface 28b of a lower flange of the guide 28 contacts the lower edge of the tape 2. On the head 5, the level regulator 105a regulates the upper edge of the tape 2, the level regulator 105b regulates the lower edge of the tape 2, and the level regulator 105c regulates the upper edge of the tape 2. Thus, the upper and lower edges of the tape 2 are alternately regulated according to the running direction of the tape 2 and the relative vertical position of the tape 2 with respect to the head 5 is regulated with high precision.

Figure 14A:
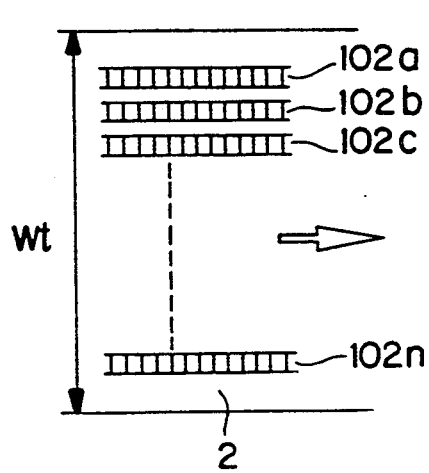
FIG. 14A is a schematic view for explaining recording tracks of a magnetic tape of a digital multichannel recorder unit to which the magnetic tape driving apparatus of the invention is applied.
Figure 14B:
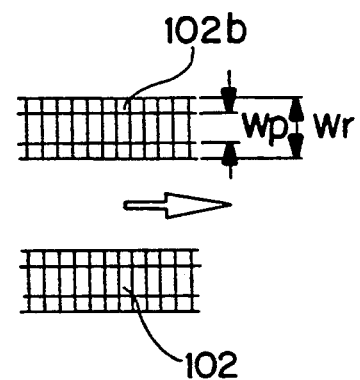
FIG. 14B is an enlarged view of the recording tracks.

For example, if the tape 2 shown in FIG. 14A has a width $W_T$ of 8 mm and the number of tracks 102a to 102n recorded within the width is 44, the width $W_R$ of tracks recorded by the recording heads 5a, 5c shown in FIG. 14B in an enlarged manner is about 100 μm and the width $W_P$ of the reproduction head 5b reproducing the recorded signal is about 60 μm. Consequently, the tape running level positioning precision in recording and reproduction needs to be at least within an error range of 40 μm. According to this embodiment, the level regulating means shown in FIG. 13 can satisfy this requirement.

Next, another embodiment of the present invention will be described with reference to FIGS. 15 to 20B. The elements having the same functions as those of the above-described embodiment are designated by identical numerals and the description thereof is not repeated.

Figure 15:
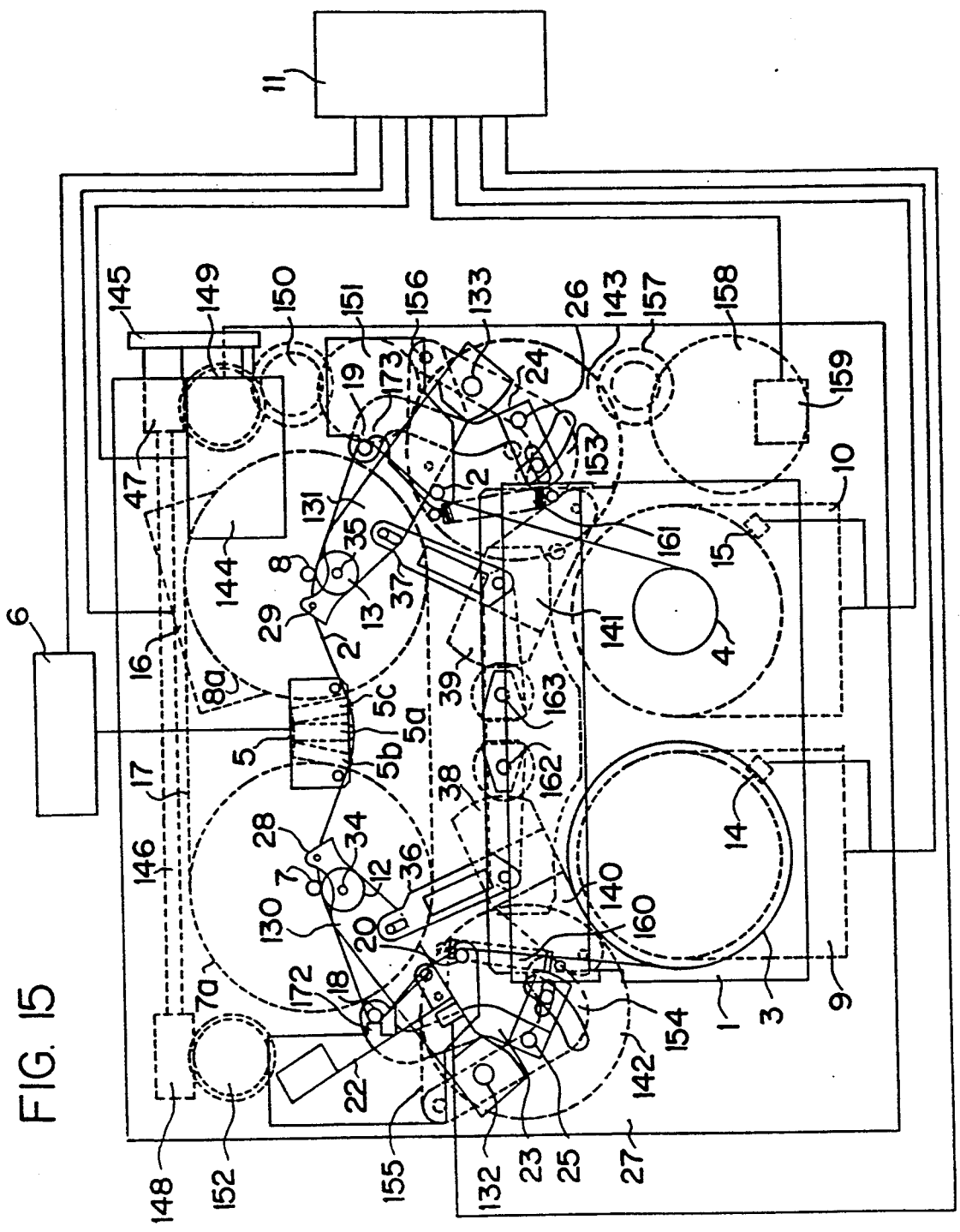
FIG. 15 is a view showing an entire construction of a magnetic tape driving apparatus according to another embodiment of the invention, which is in a recording/reproducing mode.

Referring to FIG. 15, in this embodiment, fixed guides 28 and 29 on the feed side and on the take-up side, respectively, are provided symmetrically with respect to the head 5 on the tape path between the head 5 and the capstans 7, 8 to enable accurate contact of the tape 2 with the head 5 and to ensure stable running of the tape 2 in the recording/reproducing mode. Those two fixed guides 28, 29 are attached to respective ends of pins arms 130, 131 on the feed and take-up sides for moving the pinch rollers 12, 13 corresponding to the capstans 7, 8 on both sides of the head 5, and those guides 28, 29 move together with the pinch rollers 12, 13.

Figure 16:
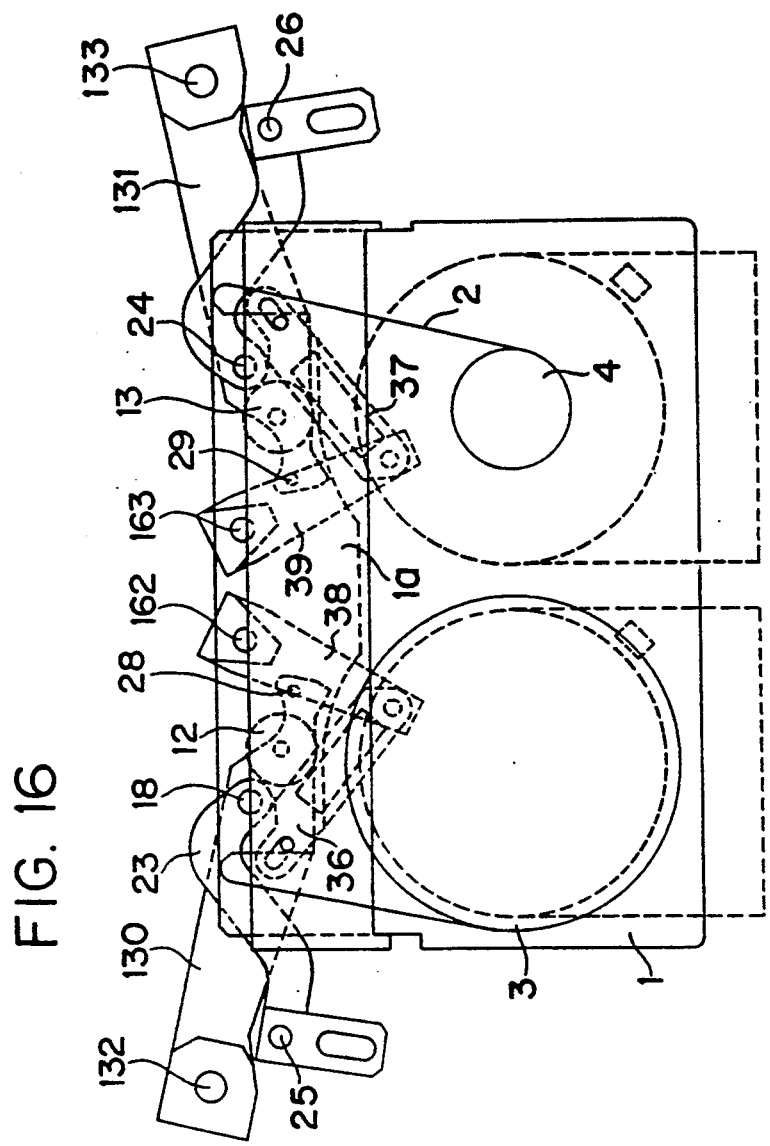
FIG. 16 is a view showing a main part structure of the above-mentioned apparatus in a cassette ejecting mode.

The pinch rollers 12, 13 correspond to the capstans 7, 8 on both sides of the head 5. The pinch rollers 12, 13 are rotatable around the pinch roller shafts 34, 35 on the feed and take-up sides attached to pinch arms 130, 131 in the same manner as in the above-mentioned drawing guides 18, 19. The respective other ends of the pinch arms 30, 31 not having the pinch rollers 12, 13 are rotatable around pinch arm shafts 132, 133 on the feed and take-up sides attached to the chassis 27. The pinch rollers 12, 13 and the fixed guides 28, 29 are inserted in the mouse 1a as shown in FIG. 16 when the cassette 1 is set in the unit DRU in the same manner as shown in the case of the above-mentioned drawing guides 18, 19, and they rotate around the pinch arm shafts 132, 133 to form a tape path in each mode. The pinch rollers 12, 13 are driven by transmission of rotations of spring link arms 38, 39 through spring links 36, 37 provided in intermediate positions between the pinch rollers 12, 13 and the pinch arm shafts 132, 133. Spring link arm shafts 62, 63 penetrating the chassis 27 to the rear surface thereof are provided in the spring link arms 38, 39 on the sides not having the spring links 36, 37, whereby driving force is transmitted from the guide moving mechanism on the rear surface of the chassis 27.

The structures and functions of the spring links 36, 37 and the members 65, 66 are the same as in the case of the above-mentioned embodiment shown in FIG. 7.

The pinch arms 130, 131 are moved through the spring links 36, 37 by utilizing spring force on the driving side of the spring link arms 38, 39 when the pinch rollers 12, 13 approach the respective capstans 7, 8. In the recording/reproducing mode where the pinch rollers 12, 13 are pressed against the capstans 7, 8, the pressing force is obtained by the spring force of the spring links 36, 37.

Figure 17:
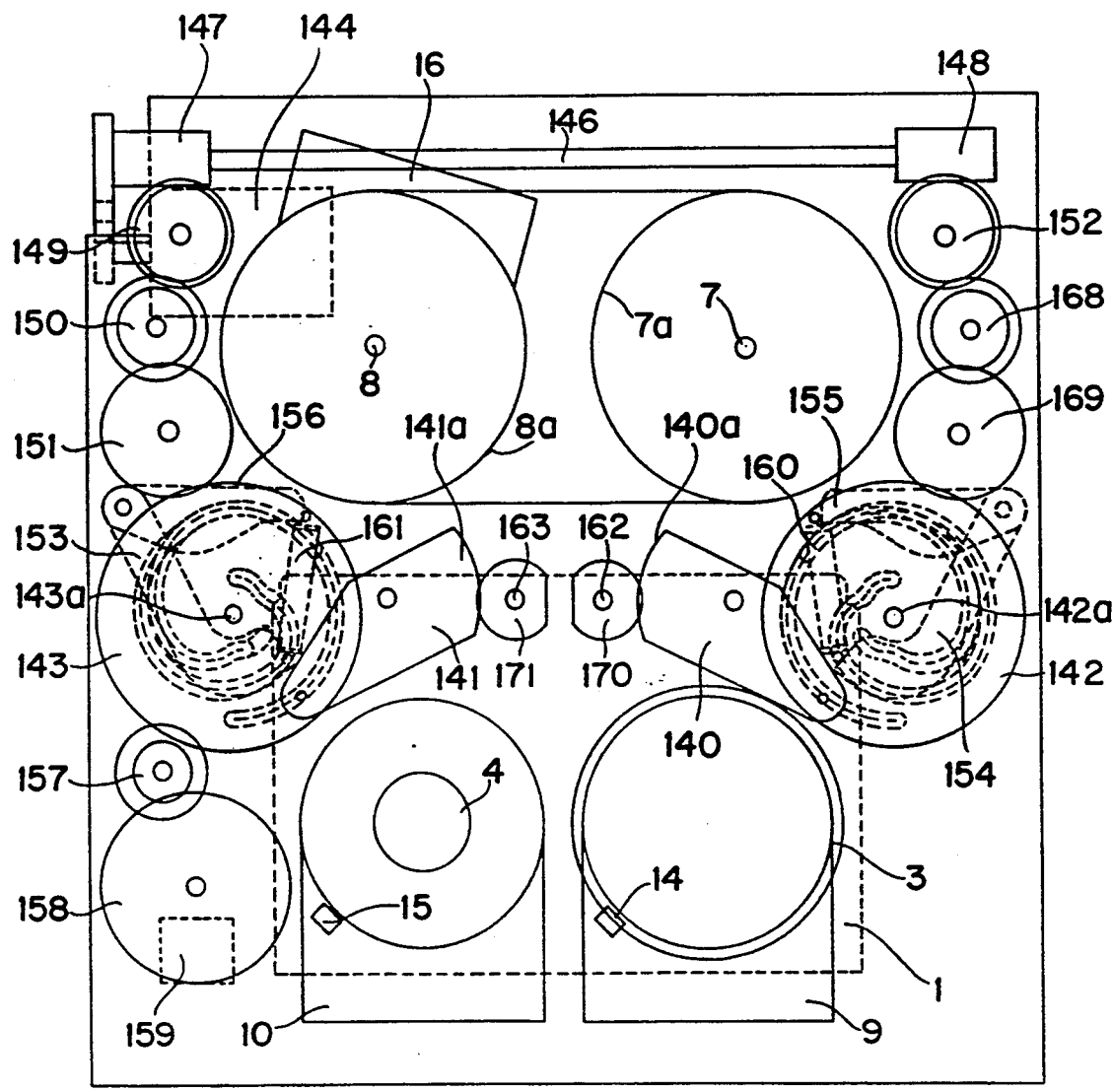
FIG. 17 is a bottom view of the entire construction of the apparatus shown in FIG. 15.

Referring to FIG. 17, the driving mechanism of the guides loading the pinch arms and the drawing guides are provided on the rear surface of the chassis 27, and driving force is transmitted by the spring link arm shafts 162, 163 etc. penetrating the chassis 27. The driving mechanism of the guides includes a tape loading motor 144 as the driving source, a revolution number reducing device for reducing the speed of rotation of the tape loading motor 144, cams 142, 143 converting rotation movement to intermittent movement to temporarily stop the guides during loading of the tape, and a device transmitting the driving force from the cams to the guides. The cams 142, 143 are provided on the feed side and on the take-up side, respectively, to operate the guides on the feed side and on the take-up side. The cams 142, 143 rotate around cam shafts 142a, 143a on the feed an take-up sides attached to the chassis 27. The cams 142, 143 are coupled by a rotation transmitting mechanism to rotate simultaneously. They are driven by a tape loading motor 144. The tape loading motor 144 is provided on the front surface of the chassis 27 and it is controlled by the control device 11. The rotation of the tape loading motor 144 is transmitted by a geared belt 145 to a gear 147 integrally formed with a worm gear on the rear surface of the chassis 27 on the take-up side of the shaft 146 penetrating the chassis 27 from the feed side to the take-up side. Worm gears 147, 148 for reducing the speed of the rotation of the tape loading motor 144 and transmitting the rotation to the cams 142, 143 are provided on the feed and take-up sides of the shaft 146 and those gears 147, 148 rotate simultaneously with the shaft 152. Three gear trains 152, 168, 169 on the feed side and three gear trains 149, 150, 151 on the take-up side are provided to further reduce the speed of the rotation transmitted from the worm gears 147, 148 and to transmit the rotation to the cams 142, 143. Thus, the rotation is transmitted to the cams 142, 143, by the worm gears 147, 148, and the gear trains 149, 150, 151, 152, 168, 169 by means of this shaft 146. The phases of the cams 142, 143 in rotation always synchronize and the driving force of the tape loading motor 144 is transmitted thereto.

Each of the cams 142, 143 has a relatively thick disc having an outer peripheral portion provided with gear teeth for transmitting the rotation. Both sides of the disc have grooves, namely, the one groove on one surface for driving the pinch arms 130, 131, the other groove on the other surface for driving the drawing guides 18, 19. The cams 142, 143 are rotated around the cam shafts 142a, 143a attached to the chassis 27 by means of the above-mentioned gear trains 149, 150, 151, 152, 168, 169. Each groove has a pin smoothly moving therein. The pins move in the respective grooves to drive the pinch arms 130, 131 and the drawing guides 18, 19.

Each of the grooves on both surfaces of the cams 142, 143 includes a spiral portion having a changing distance from the shaft to the groove when the cam rotates around the shaft, and circular arc portions having a constant distance from the shaft to the groove.

The pins in the grooves on both surfaces are attached to one end of the arm rotating around the shaft. When the cams rotate, the arm is rotated by the portion having the changing distance and the rotation of the arm is temporarily stopped by the circular arc portions having the constant distance.

In consequence, in the circular arc portions of the groove of each cam, the movements of pinch arms 130, 131, and the drawing guides 18, 19 are temporarily stopped.

The circular arc portions having the constant distance in each groove define the positions of the guides in each mode of the unit DRU. The groove for driving the pinch arms 130, 131 has four circular arc portions corresponding to the ejecting mode, the fast forwarding/rewinding mode, the search mode, and the recording/reproducing mode. The groove for driving the drawing guides 18, 19 has three circular arc portions corresponding to the ejecting mode, the fast forwarding/rewinding mode, and the search/recording/reproducing modes since the guides are in the same positions in the search mode and the recording/reproducing mode.

Figure 18:
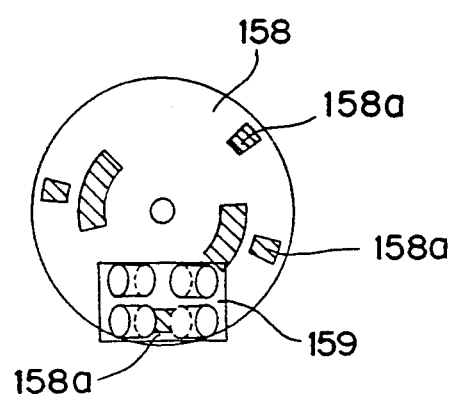
FIG. 18 is a view showing a magnetic tape position detecting mechanism in the above-mentioned apparatus.

The sensor gear 158 rotates almost by 360° when the cam 143 rotates, so as to move the pins from one end of the groove to the other end thereof. Thus, the rotation of the cam 143 is transmitted by means of a speed reducing gear 157 setting the above-mentioned ratio of speed reduction. The sensor gear 158 makes it possible to detect a rotation position by utilizing reflection of light. The detection method is the same as in the case of the above-described embodiment shown in FIG. 9. More specifically, as shown in FIG. 18, a reflection type sensor 159 capable of detecting reflection of light is provided close to the surface of the sensor gear 158 and a detection portion 158a having a different reflectance of light from that of the other surface is provided in a position for detecting the reflection on the surface of the sensor gear 158. When the sensor gear 158 rotates and the detection portion 158a passes under the reflection type sensor 159, a signal of passage is provided from the reflection type sensor 159 to the control device 11. The detection portion 158a of the sensor gear 158 detected by the reflection type sensor 159 indicates any of the circular arc portions of the grooves of the cams 142, 143, namely, the respective modes of the unit DRU.

In order to change the mode of the unit DRU and to move the guides, the control device 11 rotates the tape loading motor 144, detects the positions of the moved guides in response to signals from the sensor gear 158 and the reflection type sensor 159, and then stops the tape loading motor 144. The pinch arms 130, 131 are driven in the following manner. Fan-shaped gears 140, 141 having teeth 141a, 140a always engaging with small gears 170, 171 attached to the spring link arm shafts 162, 163 on one side, and having pins 140b, 141b inserted in the cam grooves in the cams 142, 143 for driving the pins arms on the other side are rotated around shafts 142a, 143a, by means of the pins moving in the cam grooves.

Figure 19A:
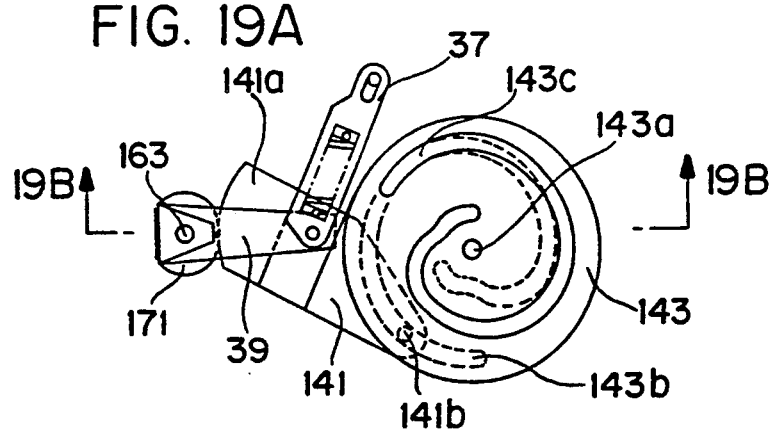
FIG. 19A is a view showing a pinch arm driving mechanism in the above-mentioned apparatus.
Figure 19B:
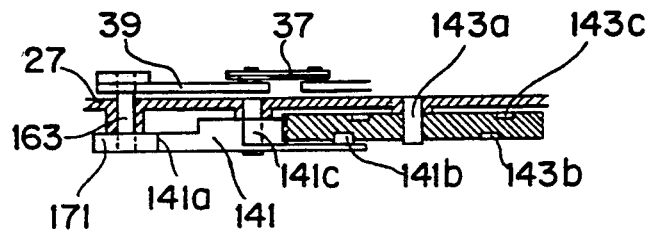
FIG. 19B is a sectional view thereof taken along A—A.
Figure 20A:
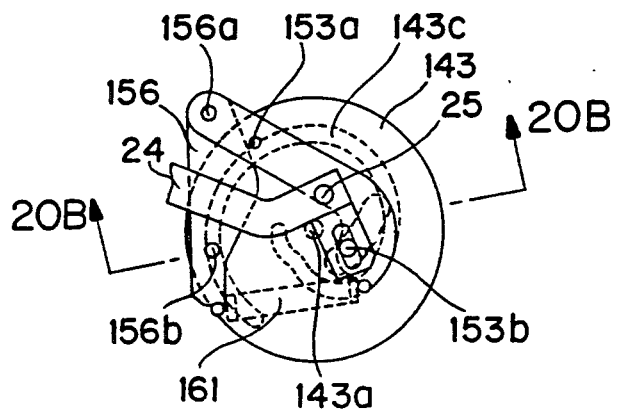
FIG. 20A is a view showing a drawing guide driving mechanism in the above-mentioned apparatus.
Figure 20B:
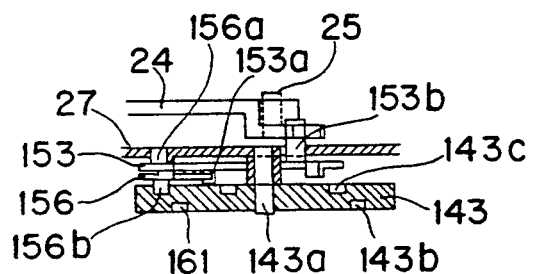
FIG. 20B is a sectional view thereof taken along A—A.

Since the structures on the feed side and on the take-up side are the same, the structure on the take-up side will be described with reference to FIGS. 19A and 19B.

The fan-shaped gear 141 rotates clockwise and counterclockwise around the shaft 141c corresponding to the center of the teeth 141a at one end. The teeth 141a are formed in a circular arc portion in a range of engagement with the small gear 171 attached to one end of the spring link arm shaft 163 since the rotation angle of the fan-shaped gear 141 is small. The pin 141b in the cam groove 143b of the cam 143 rotates the fan-shaped gear 141 around the shaft 141c according to the change in the distance between the shaft 143a and the cam groove 143b when the cam 143 rotates. The rotation of the fan-shaped gear 141 is transmitted to a small gear 171 attached to one end of the spring link arm shaft 163 engaging with the teeth 141a at the one end. The pinch arm 131 is driven by the rotation of the spring link arm shaft 163 through the spring link arm 39 and the spring link 37.

The drawing guide arms 23, 24 are driven by the drawing guide arm driving levers 153, 154, 155, 156 on the feed and take-up sides at positions between the cams 142, 143 and the chassis 27. Since the structures on the feed and take-up sides are the same, only the driving method of the drawing guide on the take-up side will be described with reference to FIGS. 20A and 20B. The drawing guide arm driving levers 153, 156 on the take-up side are rotatable around the shaft 156a for those levers attached to the chassis 27 and those two levers 153, 156 are placed one upon another. A shaft 156b entering the cam groove 143c for driving the guide arms is attached to an end of the lever 153 closer to the cam 143. The other lever 156 closer to the chassis 27 is provided with a pin 153b penetrating the chassis 27 and driving the drawing guide arm 24, and an opposite pin 153a transmitting the rotation of the lever 156 driven by the cam 143 to the lever 153. A spring 161 is disposed between the respective levers 153, 156 to constantly press the pins 153a against the lever 156. The lever 153 is driven in one direction by means of the spring force at the time of moving the lever 156 as the driving component, and the lever 153 is driven in the opposite direction without using the spring force, in the same manner as in the above-mentioned spring links 36, 37.

Referring to FIG. 15, the chassis 27 is provided with positioning blocks 172, 173 for positioning the guide arms 23, 24, so that spring force of the springs 160, 161 of the drawing guide arm driving levers 153, 154, 155, 156 is applied in the direction of tape loading. Thus, the spring force absorbs overstrokes of the cams and makes it possible to improve the positioning precision of the drawing guides 18, 19.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic tape driving apparatus, comprising:
   a stationary magnetic head for recording and reproducing digital signals simultaneously on multichannel tracks of a magnetic tape,
   tape guide means for drawing out said magnetic tape wound on a pair of supply take-up reels contained in a cassette, contacting said magnetic tape with said stationary magnetic head, and guiding running of said magnetic tape;
   a constant speed driving mechanism including a capstan rotating at a constant speed and a pinch roller pressing said magnetic tape together with the capstan in a recording and reproducing mode, on each of tape supply and take-up sides of said stationary magnetic head for maintaining a running speed of said magnetic tape constant; and
   means for rotating said pair of supply/take-up reels by regulating rotating speeds of said capstan on the tape supply side and said capstan on the tape take-up side at different speeds, so that tension on said magnetic tape on both the tape supply side and the tape take-up side are each maintained at a prescribed tension in the recording and reproducing mode.

2. The magnetic tape driving apparatus of claim 1, further comprising tape tension control means, said tape tension control means including means for detecting tension of said magnetic tape, for regulating a rotating speed of said constant speed driving mechanism on the tape supply side and the tape take-up side and for performing feedback control on a motor driving the supply reel, so that tension of said magnetic tape at a predetermined tension is maintained.

3. The magnetic tape driving apparatus of claim 2, wherein said tape tension control means further controls tension of a portion of said magnetic tape located before said capstan and pinch roller on the tape supply side and tension of a portion of said magnetic tape after said capstan and pinch roller on the tape take-up side.

4. The magnetic tape driving apparatus of claim 1, further comprising level regulators provided in predetermined portions of said stationary magnetic head and said tape guide means for regulating a running position of an upper and lower edge of said magnetic tape.

5. The magnetic tape driving apparatus of claim 4, wherein there are a plurality of level regulators arranged to alternately regulate the upper and lower edges of said magnetic tape along a tape running direction.

6. The magnetic tape driving apparatus of claim 5, wherein each of said level regulators for said magnetic tape includes an edge surface for slidably contacting at least the upper or lower edge of said magnetic tape, to regulate an upper or lower position of said magnetic tape.

7. The magnetic tape driving apparatus of claim 4, wherein each of said level regulators includes an edge surface for slidably contacting the upper or lower edge of said magnetic tape, to regulate an upper or lower position of said magnetic tape.

8. The magnetic tape driving apparatus of claim 4, said tape guide means including,
   tape drawing guides, provided on the tape supply side and the tape take-up side and positioned at one end of a tape drawing guide arm for drawing out said magnetic tape from the cassette, and
   a pair of fixed guides, provided at one end of a pinch arm for moving said capstan and said pinch roller, and located at positions nearer to said stationary magnetic head than to said tape drawing guides.

9. The magnetic tape driving apparatus of claim 8, further including at least two portions where said magnetic tape contacts and slides, said at least two portions defining a recessed section with a first and second end, the recessed section having a width larger than a width of said magnetic tape on a surface of at least the drawing guide and the fixed guide on the tape feed side, and a level of the upper or lower edge of the magnetic tape is regulated by the first end or the second end of said recessed section.

10. The magnetic tape driving apparatus of claim 8, wherein each of said magnetic drawing guides has a roller rotating around a center shaft, and an outer circumference of said roller of at least the drawing guide on the tape feed side has a small cylindrical portion at each end the distance between the cylindrical portions defining a larger width than a width of said magnetic tape, and said cylindrical portions acting as a recessed section where said magnetic tape contacts and slides.

11. A digital multichannel recorder unit including the magnetic tape driving apparatus of claim 1.

12. The magnetic tape driving apparatus of claim 1, said means for rotating includes a belt, with a prescribed elasticity, provided between said constant speed driving mechanism and said pair of tape supply/take-up reels, said belt providing an effective driving force, so that the rotating speed of the capstan on the tape supply side is slower than the rotating speed of the capstan on the tape take-up side.

13. The magnetic tape driving apparatus of claim 1, said constant speed driving mechanism including a sensor for detecting tension of said magnetic tape between said tape supply reel and the capstan on the tape supply side to produce a tape tension signal, and means for processing the tape tension signal to drive said tape supply reel, so that the tension of said magnetic tape is maintained constant.

14. The magnetic tape driving apparatus of claim 1, said constant speed driving mechanism including means for detecting a rotating speed of said tape take-up reel and means for calculating a number of turns of said magnetic tape and a corresponding power value, and means for using the rotating speed and calculation for maintaining the tension of the tape at the take-up reel constant.

15. The magnetic tape driving apparatus of claim 14 wherein an initial number of turns of said magnetic tape is detected by sensing a rotating speed of tape supply reel when said magnetic tape first belongs to run at a constant speed.

16. The magnetic tape driving apparatus of claim 14 wherein a diameter of turns of said magnetic tape is detected by sensing a rotating speed of tape supply reel when said magnetic tape first begins to run at a constant speed.

17. The magnetic tape driving apparatus of claim 14 wherein an initial number of turns of said magnetic tape is detected by sensing a rotating speed of tape supply reel when said magnetic tape first begins to run at a constant speed.

18. The magnetic tape driving apparatus of claim 1, said constant speed driving mechanism including means for detecting a rotating speed of said take-up reel and means for calculating the diameter of turns of said magnetic tape on the take-up reel and means for using the rotating speed and calculation and a corresponding power value, for maintaining the tension of the tape at the take-up reel constant.

19. The magnetic tape driving apparatus of claim 1, wherein said means for rotating rotates the capstan for the tape supply side at a speed slower as compared to the speed of the captan on the tape take-up side.

* * * * *